United States Patent
Oh et al.

(10) Patent No.: US 7,872,721 B2
(45) Date of Patent: Jan. 18, 2011

(54) HORIZONTAL ELECTRIC FIELD SWITCHING LIQUID CRYSTAL DISPLAY DEVICE AND FABRICATING METHOD THEREOF

(75) Inventors: Jae Young Oh, Gyeonggi-do (KR); Sung Jin Hong, Seoul (KR)

(73) Assignee: LG Display Co., Ltd., Seoul (KR)

( * ) Notice: Subject to any disclaimer, the term of this patent is extended or adjusted under 35 U.S.C. 154(b) by 909 days.

(21) Appl. No.: 11/451,484

(22) Filed: Jun. 13, 2006

(65) Prior Publication Data

US 2006/0290864 A1  Dec. 28, 2006

(30) Foreign Application Priority Data

Jun. 28, 2005  (KR) ...................... 10-2005-0056560

(51) Int. Cl.
  *G02F 1/1343* (2006.01)
  *G02F 1/1345* (2006.01)
(52) U.S. Cl. ........................... 349/141; 349/38; 349/152
(58) Field of Classification Search ................. 349/141, 349/38, 152
  See application file for complete search history.

(56) References Cited

U.S. PATENT DOCUMENTS

| | | | | |
|---|---|---|---|---|
| 6,486,933 | B1* | 11/2002 | Cha et al. | 349/139 |
| 2003/0058396 | A1* | 3/2003 | Shih | 349/141 |
| 2003/0160921 | A1* | 8/2003 | Nakashima et al. | 349/113 |
| 2005/0094079 | A1* | 5/2005 | Yoo et al. | 349/141 |

* cited by examiner

*Primary Examiner*—David Nelms
*Assistant Examiner*—Lauren Nguyen
(74) *Attorney, Agent, or Firm*—Morgan Lewis & Bockius LLP

(57) ABSTRACT

A horizontal electric field switching liquid crystal display device includes a gate line, a common line parallel to the gate line and provided at an area adjacent to the gate line, a data line crossing the gate line with a gate insulating film therebetween to define a pixel area, a thin film transistor provided adjacent to a crossing of the gate line and the data line, a common electrode provided in the pixel area and connected to the common line, a pixel electrode connected to the thin film transistor and provided in such a manner to form a horizontal electric field along with the common electrode in the pixel area on the same plane as the common electrode, a storage capacitor electrode overlapping the common electrode to provide a storage capacitor, and a contact electrode contacting the pixel electrode, the thin film transistor and the storage electrode at their side surfaces.

9 Claims, 26 Drawing Sheets

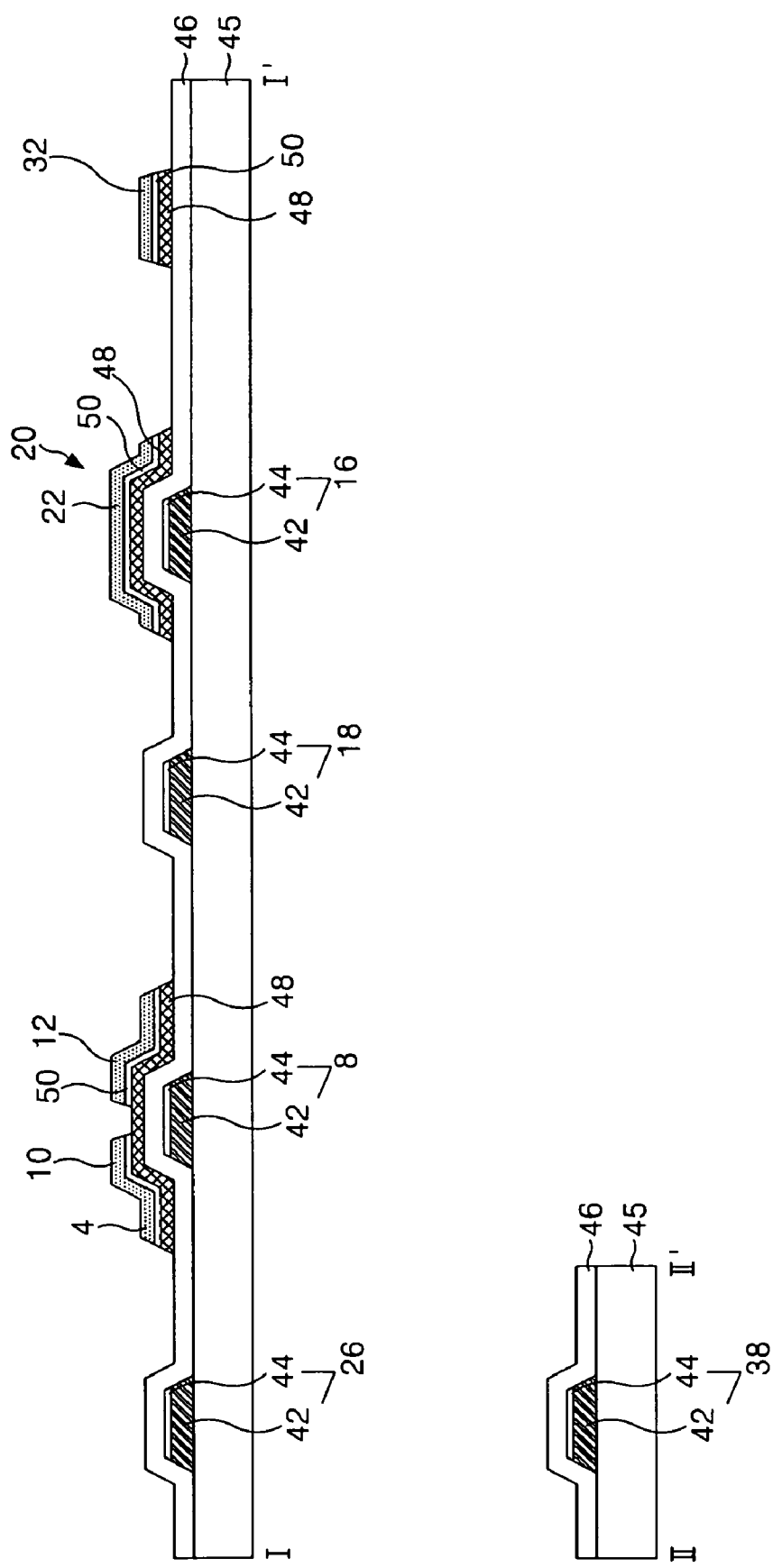

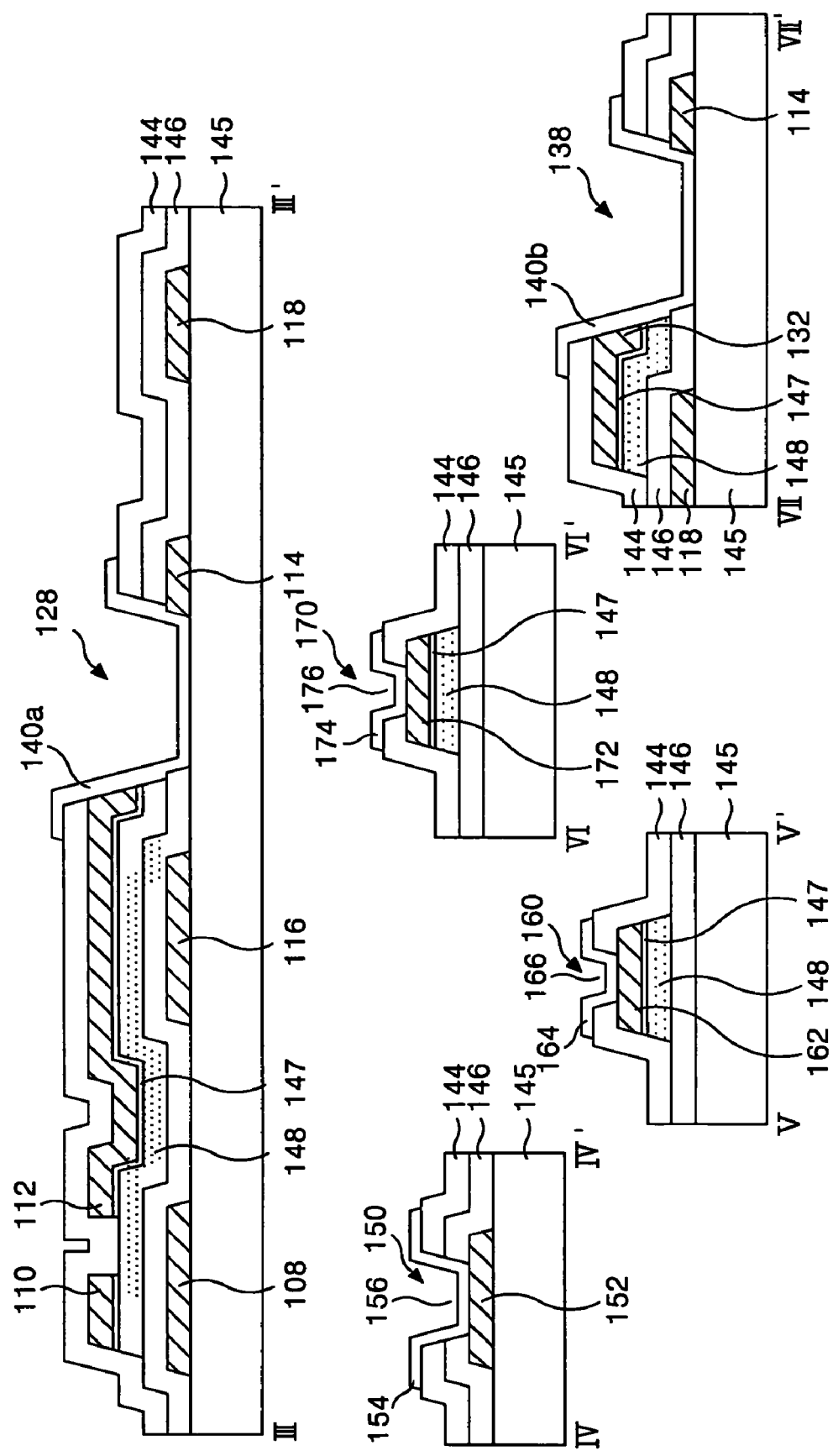

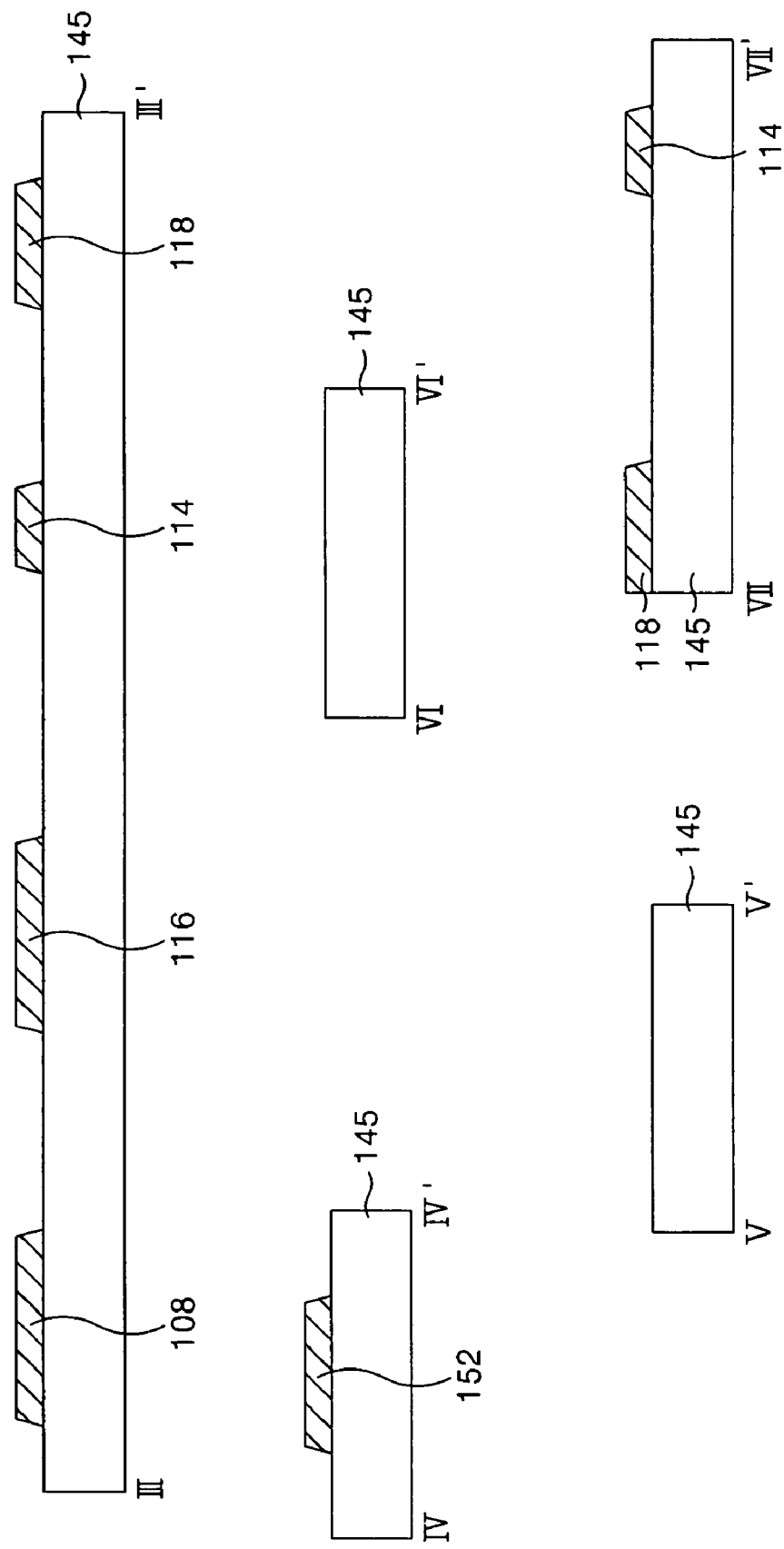

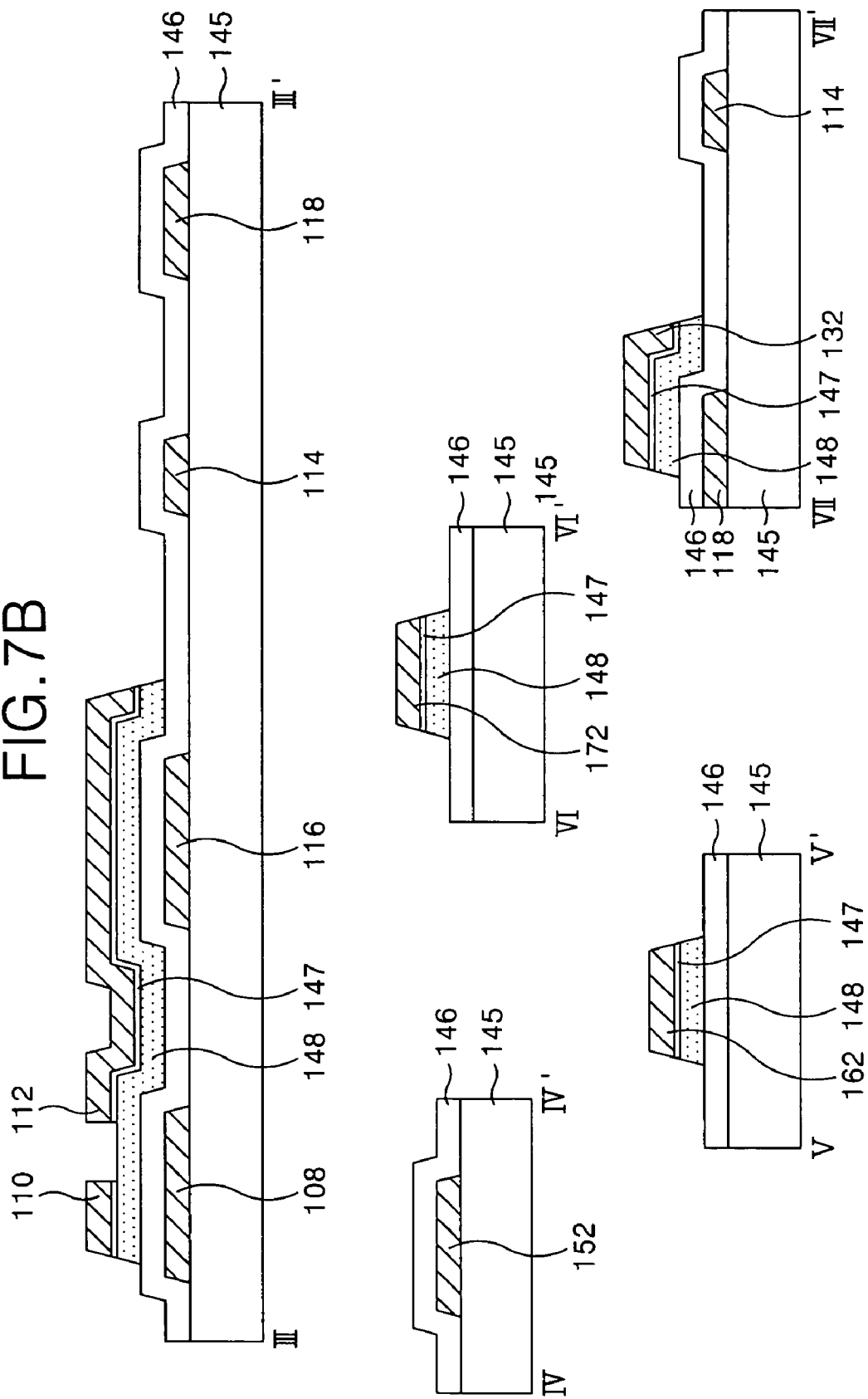

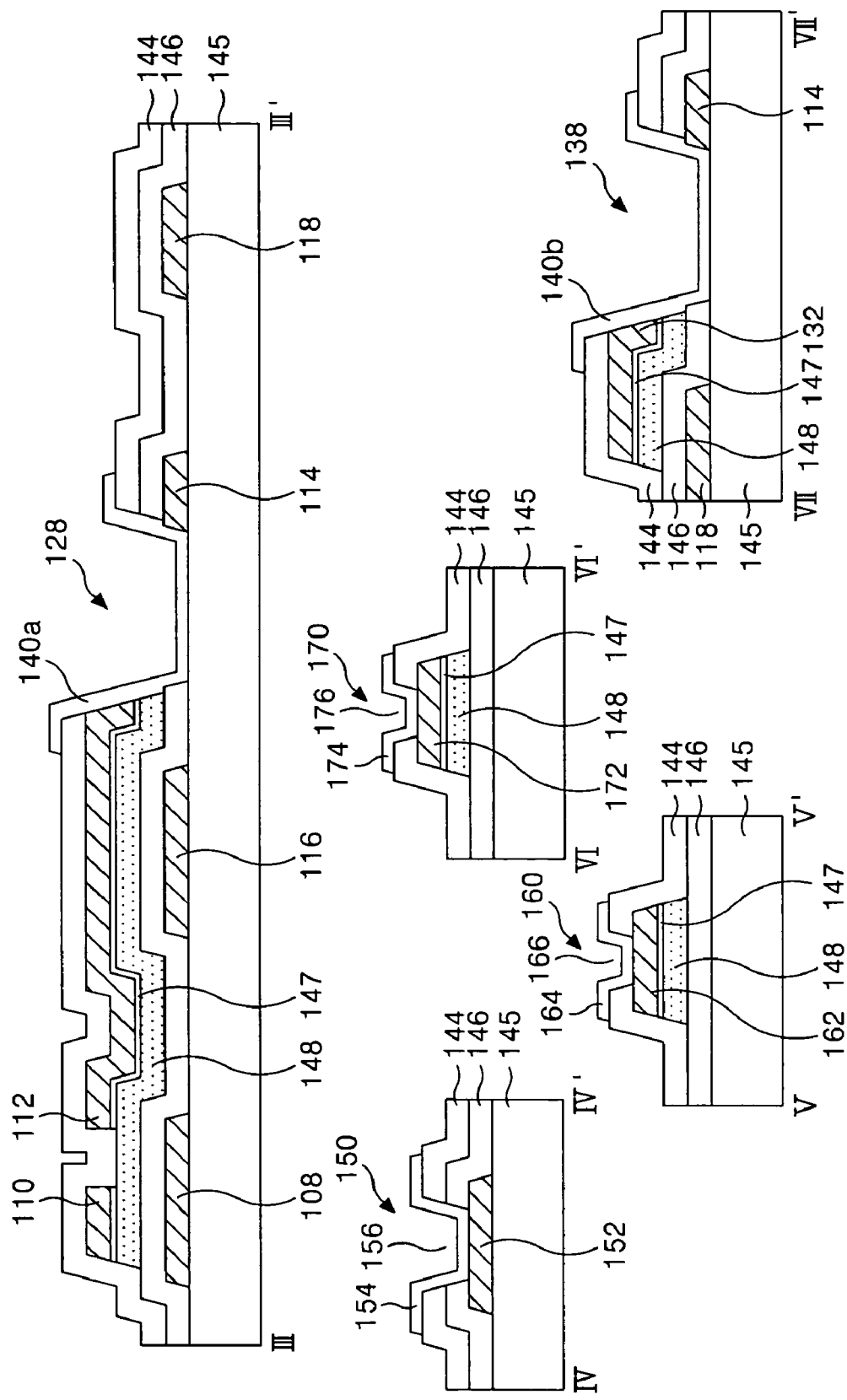

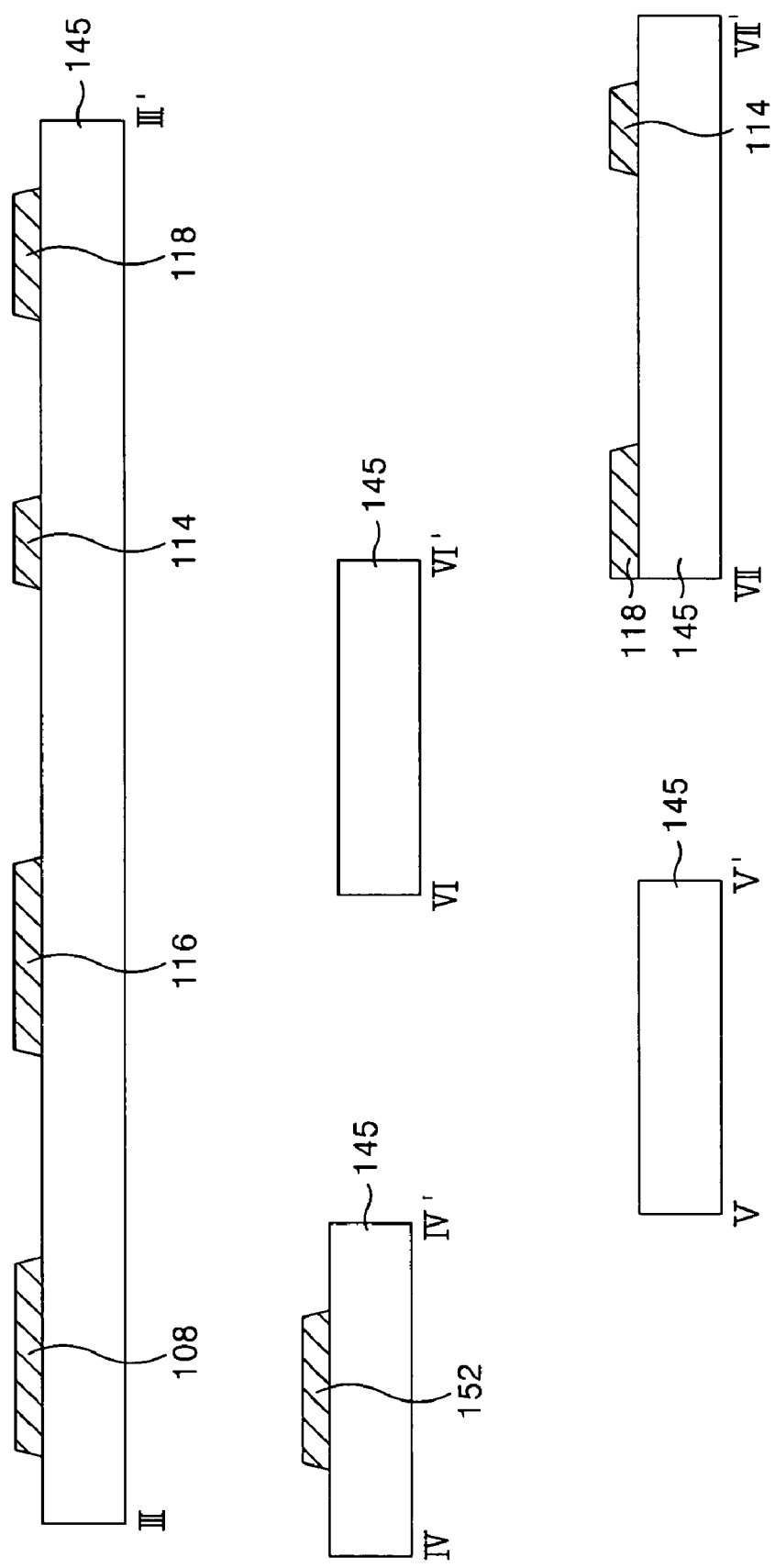

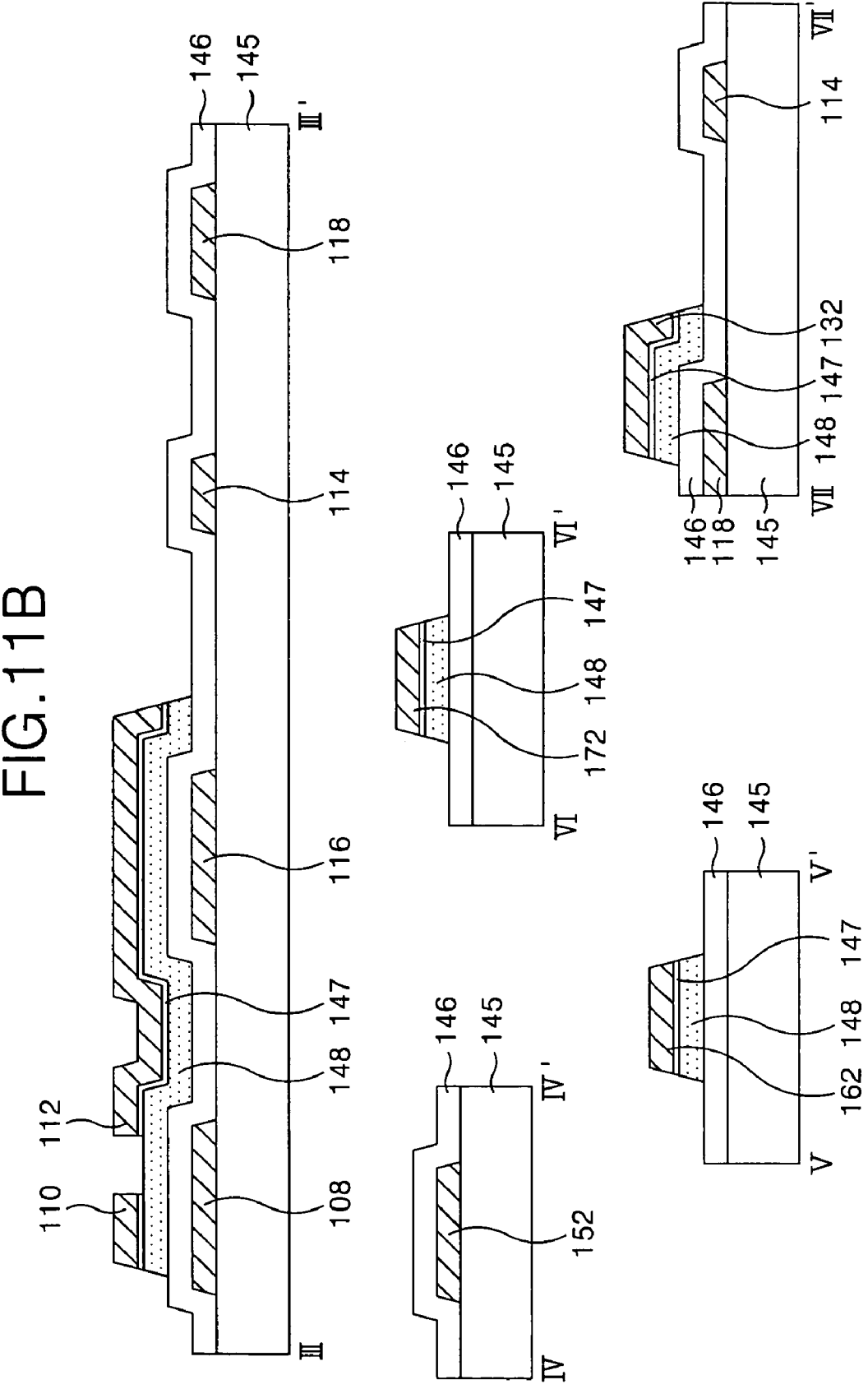

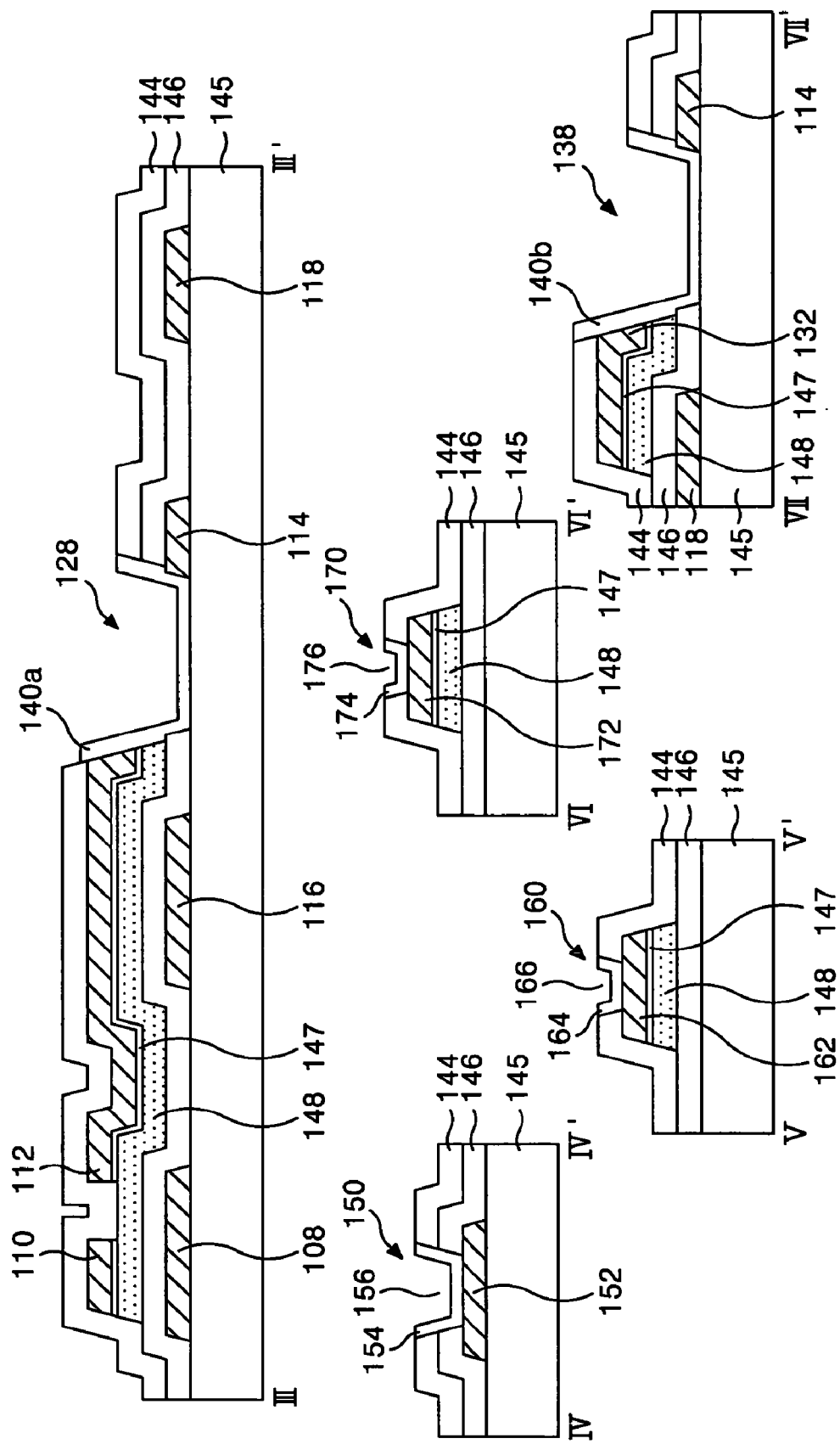

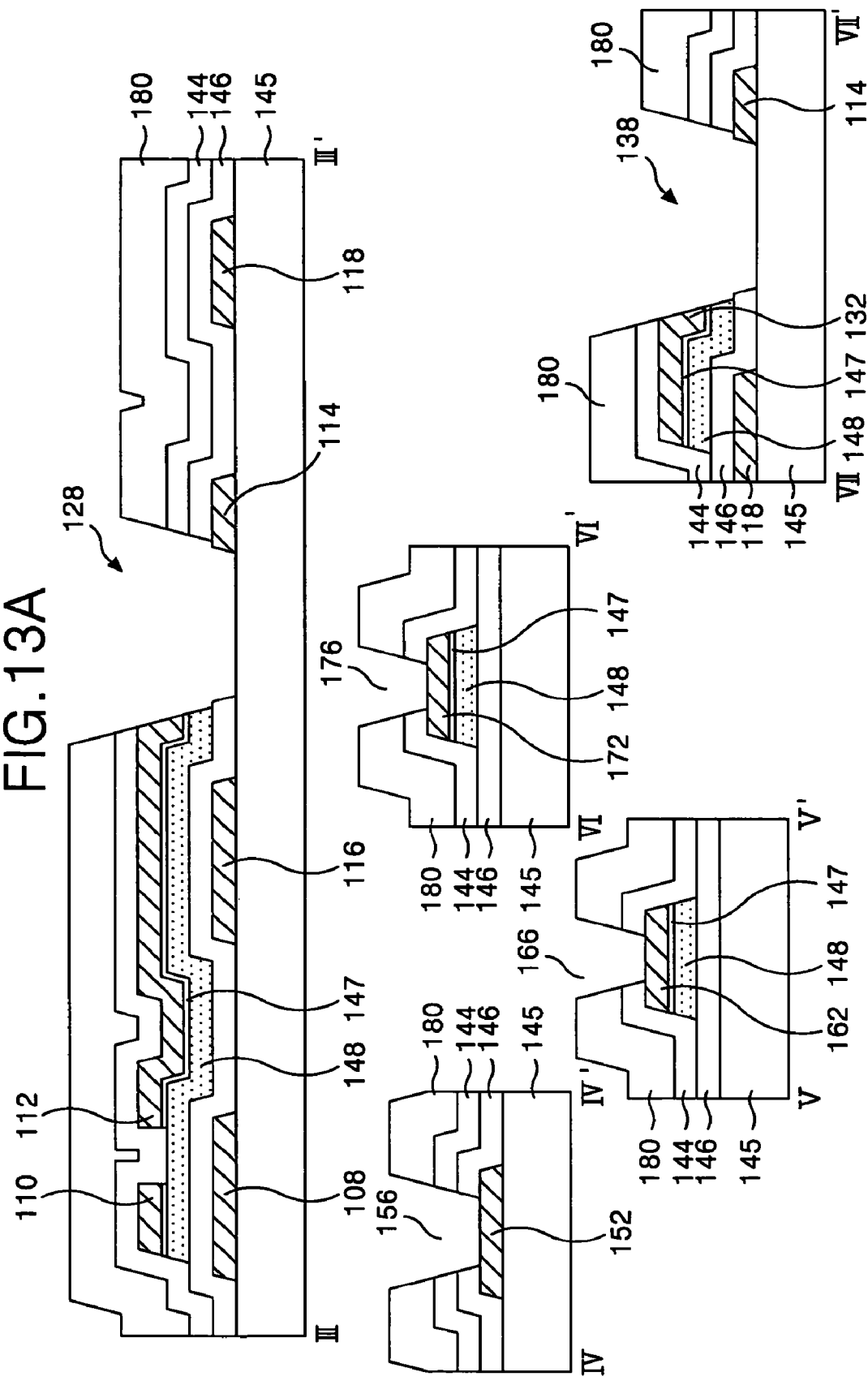

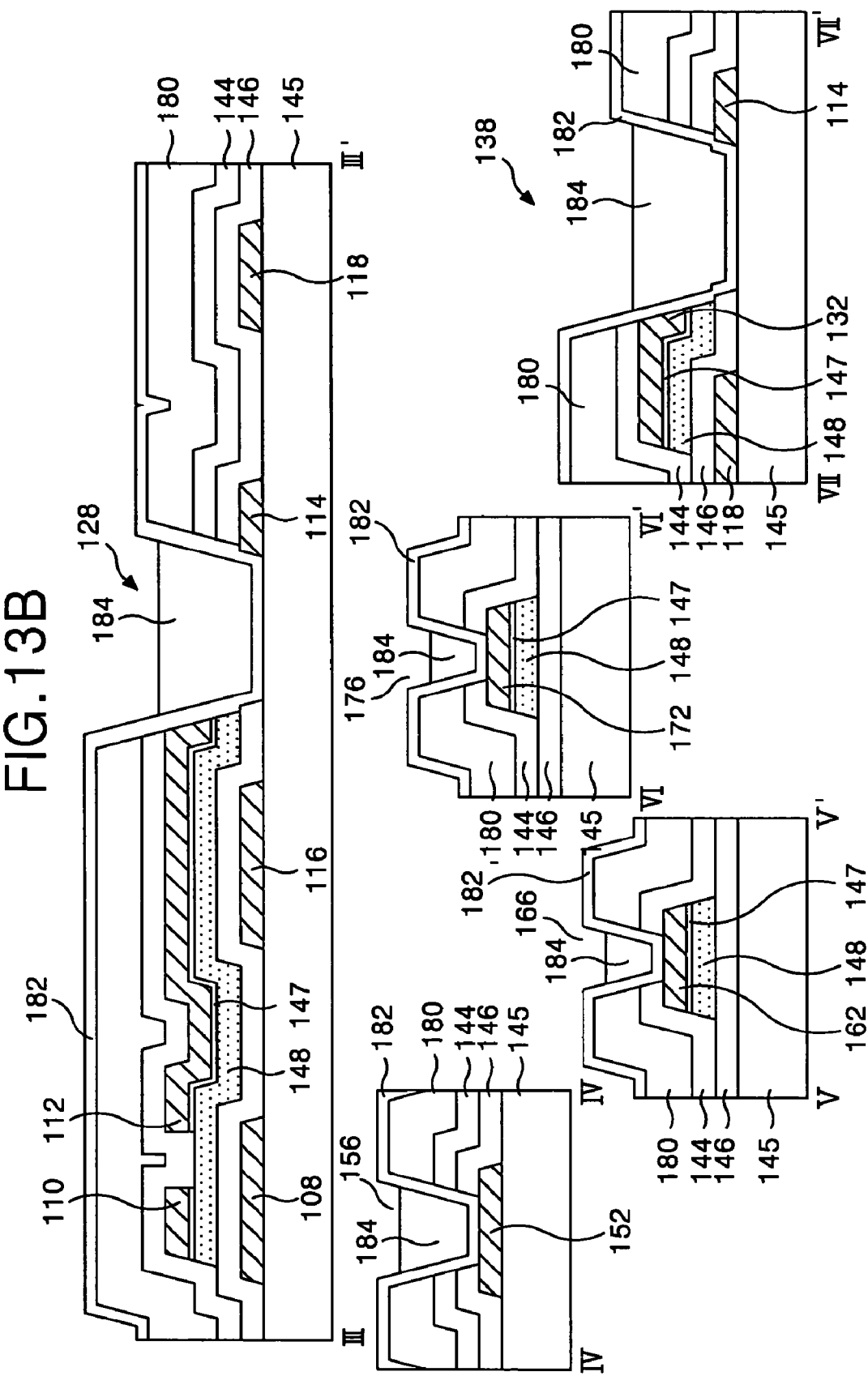

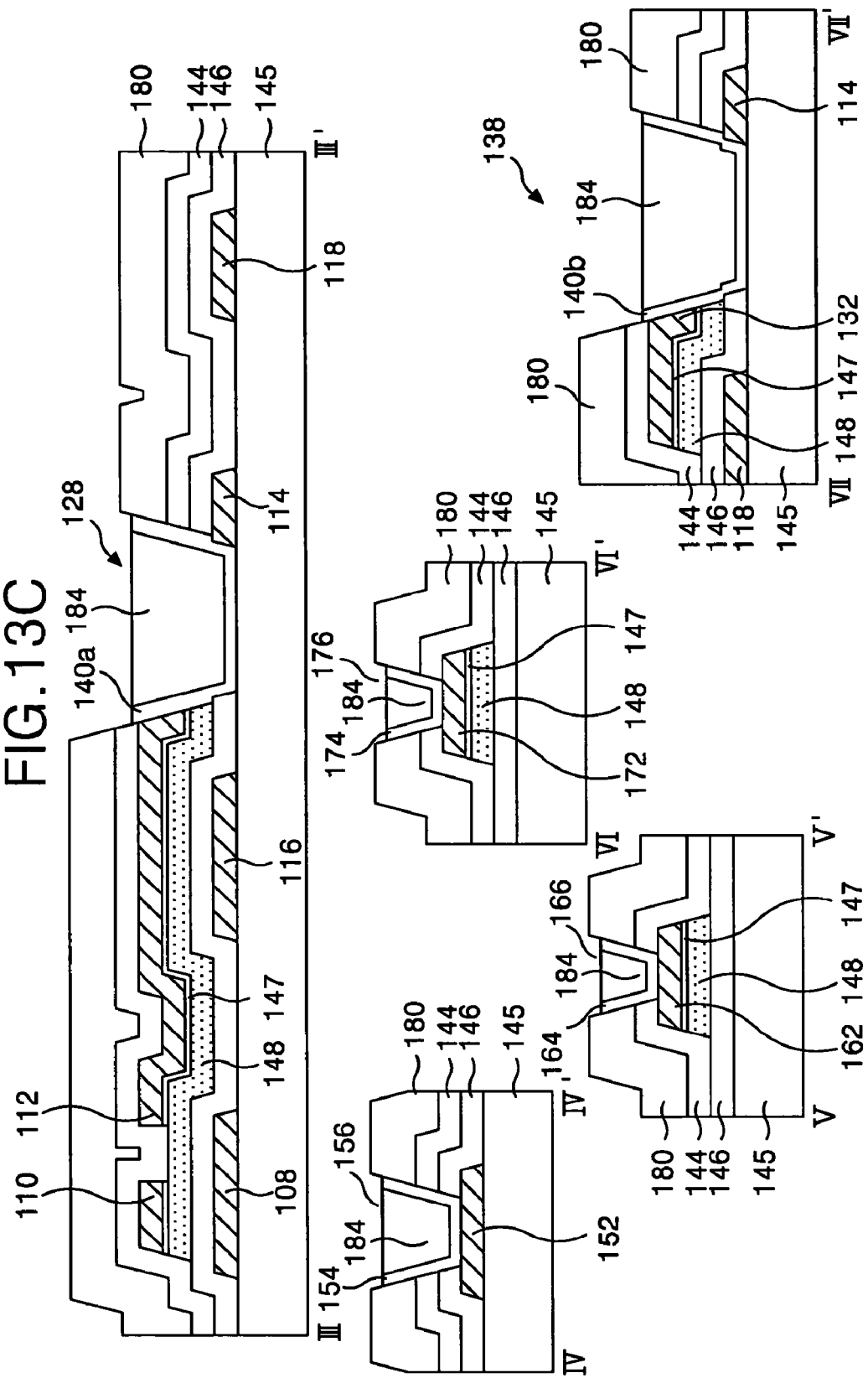

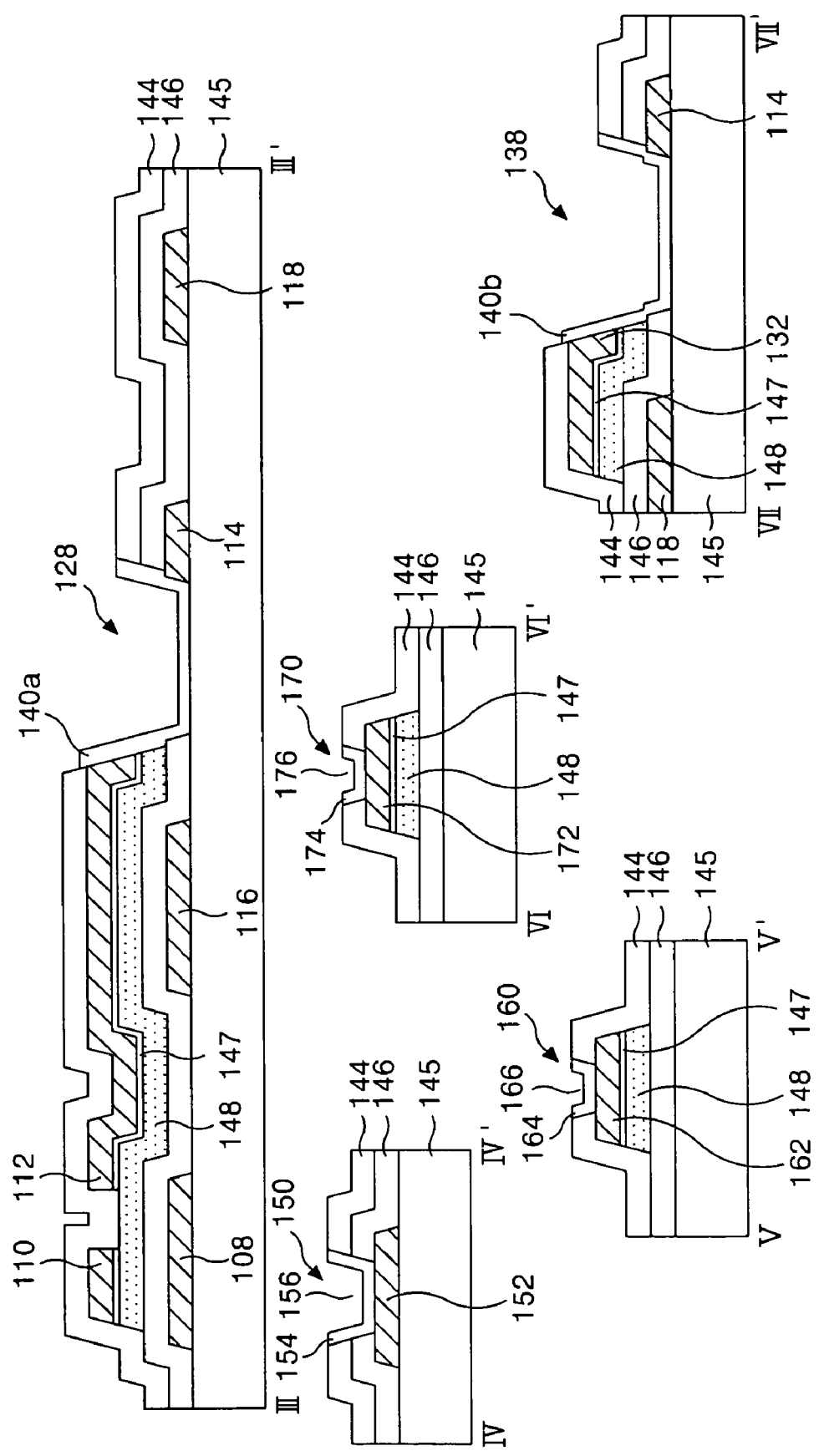

HORIZONTAL ELECTRIC FIELD SWITCHING LIQUID CRYSTAL DISPLAY DEVICE AND FABRICATING METHOD THEREOF

This application claims the benefit of Korean Patent Application No. P2005-0056560 filed in Korea on Jun. 28, 2005, which is hereby incorporated by reference in its entirety.

BACKGROUND OF THE INVENTION

1. Field of the Invention

This invention relates to a liquid crystal display device, and more particularly to a horizontal electric field switching liquid crystal display device and a fabricating method thereof. Although the present invention is suitable for a wide scope of applications, it is particularly suitable for a horizontal electric field switching liquid crystal display (LCD) device formed using a reduced number of masking processes having increased capacitance.

2. Description of the Related Art

Generally, a liquid crystal display device controls light transmittance of a liquid crystal molecules having a dielectric anisotropy using an electric field to thereby display a picture. The liquid crystal molecules are positioned between upper and lower substrates. Such LCD devices are classified as either a vertical electric field switching type or a horizontal electric field switching type depending upon the direction of the electric field driving the liquid crystal molecules.

The LCD device of the vertical electric field switching type can drive the liquid crystal molecules in a twisted nematic (TN) mode with a vertical electric field formed between a pixel electrode and a common electrode arranged in opposition to each other on the upper and lower substrates. Such a TN mode LCD device has the advantage of a large aperture ratio. However, the TN mode LCD device has the drawback of a narrow viewing angle that is about 90°.

The LCD device of a horizontal electric field switching type can drive a the liquid crystal molecules in an in-plane switching (IPS) mode or with a horizontal electric field between the pixel electrode and the common electrode arranged in parallel to each other on the lower substrate. Such an IPS mode LCD device has the advantage of a wide viewing angle, which is about 160°. Hereinafter, a related art IPS mode LCD device will be described in detail.

A related art IPS mode LCD device includes a thin film transistor array substrate (lower substrate) and a color filter array substrates (upper substrate) that are opposed to each other, a spacer for constantly keeping a cell gap between the two substrates, and a layer of liquid crystal molecules within the cell gap. The thin film transistor array substrate includes a plurality of signal wirings and thin film transistors, and an upper alignment film coated thereon to align the liquid crystal molecules. The color filter array substrate includes a color filter for implementing color, a black matrix for preventing light leakage and an upper alignment film coated thereon to align the liquid crystal molecules.

Fabrication of the thin film transistor array substrate includes semiconductor processes that require a plurality of mask processes. Each of the mask processes are complicated fabricating processes that add to the manufacturing cost of the liquid crystal display panel. One mask process includes many process steps, such as thin film deposition, cleaning, photolithography, etching, photo-resist stripping and an inspection processes. To reduce manufacturing cost, a thin film transistor array substrate has been developed, which can be made with a reduced number of mask processes. For example, reducing a standard five-round mask process for forming a thin film transistor substrate to a four-round mask process for forming a thin film transistor array substrate has been suggested recently.

FIG. 1 is a plan view showing a portion of a thin film transistor array substrate of an IPS mode liquid crystal display device formed by a related art four-round mask process, and FIG. 2 is a cross-sectional view of the thin film transistor array substrate along the lines I-I' and II-II' in FIG. 1. As shown in FIG. 1 and FIG. 2, the thin film transistor array substrate includes a gate line 2 and a data line 4 provided on a lower substrate 45 in such a manner to cross each other with a gate insulating film 46 therebetween. A thin film transistor 6 is formed at each crossing of a gate line 2 and a data line 4. A pixel electrode 14 and a common electrode 18 are formed in such a manner on the thin film transistor array substrate to provide a horizontal electric field in a pixel area defined by the gate line 2 and a data line 4. A common line 16 is connected to the common electrode 18. A storage capacitor 20 is formed by a portion of the pixel electrode 14 that overlaps a common electrode line 16. A gate pad 24 is connected to the gate line 2. A data pad 33 is connected to the data line 4. A common pad 36 is connected to the common line 16.

The data line 4 supplies a data signal to the pixel electrode 14 through the thin film transistor 6 while the gate line 2 supplies a gate signal. More specifically, the thin film transistor 6 allows a pixel signal applied to the data line 4 to be charged onto the pixel electrode 14 in response to a scanning signal applied to the gate line 2. The common line 16 supplies a reference voltage for driving the liquid crystal and is formed in parallel to the gate line 2.

The thin film transistor 6 includes a gate electrode 8 connected to the gate line 2, a source electrode 10 connected to the data line 4 and a drain electrode 12 connected to the pixel electrode 14. The thin film transistor 6 also includes an active layer 48 overlapping the gate electrode 8 with a gate insulating film 46 therebetween. The active layer 48 has a channel between the source electrode 10 and the drain electrode 12. Other active layers 48 are formed in such a manner as to respectively overlap the data line 4, a lower data pad electrode 32 and an upper storage electrode 22. Further, the data line 4, the source electrode 10, the drain electrode 12, the lower data pad electrode 32 and an ohmic contact layer 50 for making an ohmic contact with the upper storage electrode 22 are provided on the active layers 48.

The pixel electrode 14 is formed in the pixel area and connected, via a first contact hole 13 passing through a protective film 52, to the drain electrode 12 of the thin film transistor 6. More particularly, the pixel electrode 14 includes a first horizontal portion 14A connected to the drain electrode 12 and formed in parallel to the adjacent gate line 2, a second horizontal portion 14B formed in such a manner as to overlap the common line 16 and finger portions 14C formed in parallel between the first and second horizontal portions 14A and 14B. The common electrode 18 is connected to the common line 16 and is formed in the pixel area. More particularly, the common electrode 18 has fingers formed in parallel to the finger portions 14C of the pixel electrode 14 in the pixel area.

A horizontal electric field can be formed between the pixel electrode 14, supplied with a pixel signal via the thin film transistor 6, and the common electrode 18, supplied with a reference voltage via the common line 16. More particularly, a horizontal electric field is formed between the finger portions 14C of the pixel electrode 14 and the fingers of the common electrode 18. Liquid crystal molecules are re-arranged or rotated in the horizontal direction between the thin film transistor array substrate and the color filter array substrate by such a horizontal electric field due to a dielectric anisotropy of the liquid crystal molecules. Transmittance of a light transmitting through the pixel area is differentiated depending upon a rotation extent of the liquid crystal molecules, thereby implementing a range of gray levels.

The storage capacitor 20 includes an upper storage electrode 22 overlapping the common line 16 with the gate insulating film 46, the active layer 48 and the ohmic contact layer 50 therebetween. The pixel electrode 14 is connected, via a second contact hole 21 provided on the protective film 52, to the upper storage electrode 22. Such a storage capacitor 20 allows a pixel signal charged onto the pixel electrode 14 to be stably maintained until the next pixel signal is charged.

The gate line 2 is connected, via the gate pad 24, to a gate driver (not shown). The gate pad 24 includes a lower gate pad electrode 26 extending from the gate line 2 and an upper gate pad electrode 28 connected, via a third contact hole 27 passing through the gate insulating film 46 and a protective film 52, to the lower gate pad electrode 26. The data line 4 is connected via the data pad 30 to a data driver (not shown). The data pad 30 includes a lower data pad electrode 32 extending from the data line 4 and an upper data pad electrode 34 connected, via a fourth contact hole 33 passing through the protective film 52, to the lower data pad electrode 32. The common line 16 is supplied, via a common pad 36, with a reference voltage from a reference voltage source (not shown). The common pad 36 is includes a lower common pad electrode 38 extending from the common line 16 and an upper common pad electrode 40 connected, via a five contact hole 39 passing through the gate insulating film 46 and the protective film 52, to the lower common pad electrode 38.

A method of fabricating a thin film transistor array substrate using a four-round mask process having will be described in detail with reference to FIG. 3A to FIG. 3D. As shown in FIG. 3A, a first conductive pattern group including the gate line 2, the gate electrode 8, the lower gate pad electrode 26, the common line 16, the common electrode 18 and the lower common pad electrode 38 is formed on the lower substrate 45 using a first mask process. More particularly, a first and second metal layer 42 and 44 are sequentially disposed on the lower substrate 45 by a deposition technique, such as sputtering, thereby providing a gate metal layer including two metal films. Next, the gate metal layer is patterned by a photolithography process and an etching process using the first mask, thereby providing the first conductive pattern group including the gate line 2, the gate electrode 8, the lower gate pad electrode 26, the common line 16, the common electrode 18 and the lower common pad electrode 38. Herein, the first metal film 42 is formed from an Al-alloy metal etc., and the second metal film 44 is a metal, such as one of Chrome Cr and molybdenum Mo.

Referring to FIG. 3B, a gate insulating film 46 is coated onto the lower substrate 45 provided with the first conductive pattern group. A semiconductor pattern including the active layer 48 and the ohmic contact layer 50, and a second conductive pattern group including the data line 4, the source electrode 10, the drain electrode 12, the lower data pad electrode 32 and the upper storage electrode 22 are formed on the gate insulating film 46 using a second mask process. More particularly, the gate insulating film 46, an amorphous silicon layer, an amorphous silicon layer doped with n+ impurities and a source/drain metal layer are sequentially formed on the lower substrate 45 provided with the first conductive pattern group by a deposition technique, such as PECVD or sputtering. Herein, the gate insulating film 46 is formed from an inorganic insulating material, such as silicon oxide (SiOx) or silicon nitride (SiNx). The source/drain metal is formed of at least one of molybdenum (Mo), titanium (Ti), tantalum (Ta) and Mo-alloy.

Next, a photo-resist pattern is formed on the source/drain metal layer by a photolithography process using the second mask. In this case, the second mask employs a diffractive exposure mask having a diffractive exposure portion corresponding to the position of the channel of the thin film transistor. The portion of photo-resist pattern for the channel has a lower height than other portions, which is later ashed away and used to etch the source/drain electrodes above the channel region.

Next, the source/drain metal layer is patterned by a wet-etching process using the photo-resist pattern, thereby providing a second conductive pattern group including the data line 4, the source electrode 10, the drain electrode 12 integral with the source electrode 10, and the upper storage electrode 22. And then, the amorphous silicon layer doped with n+ impurities and the amorphous silicon layer are simultaneously patterned by a dry-etching process using the same photo-resist pattern, thereby providing the ohmic contact layer 50 and the active layer 48. Subsequently, the portion of the photo-resist pattern having a relatively low height at the channel is removed by an ashing process. Then, a source/drain metal pattern and the ohmic contact layer 50 of the channel are formed by a dry-etching process. After the dry-etching process, the active layer 48 of the channel is exposed, so that the source electrode 10 and the drain electrode 12 are separated from each other. Next, the photo-resist pattern left on the second conductive pattern group is removed by a stripping process.

Referring to FIG. 3C, the protective film 52 having first to fifth contact holes 13, 21, 27, 33 and 39 is formed on the gate insulating film 46 provided with the second conductive pattern group using a third mask process. More particularly, the protective film 52 is formed over the entire gate insulating film 46, including the second conductive pattern group, by a deposition technique, such as PECVD. Next, the protective film 52 is patterned by a photolithography process and etching process using a third mask, thereby providing the first to fifth contact holes 13, 21, 27, 33 and 39. The first contact hole 13 passes through the protective film 52 to expose the drain electrode 12. The second contact hole 21 passes through the protective film 52 to expose the upper storage electrode 22. The third contact hole 27 passes through the protective film 52 and the gate insulating film 46 to expose the lower gate pad electrode 26. The fourth contact hole 33 passes through the protective film 52 to expose the lower data pad electrode 32. The fifth contact hole 39 passes through the protective film 52 and the gate insulating film 46 to expose the lower common pad electrode 38. The source/drain metal is a metal having a high dry-etching ratio, such as a molybdenum Mo. The first, second and fourth contact holes 12, 21 and 33 respectively pass through the drain electrode 12, the upper storage electrode 22 and the lower data pad electrode 32 to expose side surfaces thereof. The protective film 52 is made of an inorganic insulating material identical to the gate insulating film 46, or an organic insulating material, such as an acrylic organic compound having a small dielectric constant, BCB (benzocyclobutene) or PFCB (perfluorocyclobutane).

Referring to FIG. 3D, a third conductive pattern group, including the pixel electrode 14, the upper gate pad electrode 28, the upper data pad electrode 34 and the upper common pad electrode 40, is formed on the protective film 52 using a fourth mask process. More particularly, a transparent conductive layer is coated on the protective film 52 by a deposition technique, such as sputtering. Next, the transparent conductive layer is patterned by a photolithography process and an etching process using a fourth mask, thereby providing the third conductive pattern group including the pixel electrode 14, the upper gate pad electrode 28, the upper data pad electrode 34 and the upper common pad electrode 40. The pixel electrode 14 is electrically connected, via the first contact hole 13, to the drain electrode 12 and is electrically connected, via the second contact hole 21, to the upper storage electrode 22. The upper gate pad electrode 28 is electrically connected, via the third contact hole 37, to the lower gate pad electrode 26. The upper data pad electrode 34 is electrically connected, via the fourth contact hole 33, to the lower data pad electrode 32. The upper common pad electrode 40 is electrically connected, via the fifth contact hole 39, to the lower common pad electrode 38. The transparent conductive layer can be made of one of Indium Tin Oxide (ITO), Tin Oxide (TO) and Indium Zinc Oxide (IZO).

As described-above, a related art thin film transistor array substrate of an IPS mode liquid crystal display device and a fabricating method thereof uses a four-round mask process to reduce the number of mask processes as compared to a five-round mask process and to reduce the manufacturing cost. But, the four-round mask process has a drawback in that the capacitance capability with respect to the pixel electrode is small. Therefore, a horizontal electric field switching liquid crystal display device having increased capacitance and a fabricating process using four or less mask-rounds is needed to improve performance and/or further reduce the manufacturing cost.

SUMMARY OF THE INVENTION

Accordingly, the present invention is directed to a horizontal electric field switching liquid crystal display device and a fabricating method thereof that substantially obviate one or more of the problems due to limitations and disadvantages of the related art.

An object of the present invention to provide a horizontal electric field switching liquid crystal display device and a fabricating method thereof having a reduced number of mask rounds.

Another object of the present invention to provide a horizontal electric field switching liquid crystal display device having improved capacitance.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a horizontal electric field switching liquid crystal display device includes a gate line, a common line parallel to the gate line and provided at an area adjacent to the gate line, a data line crossing the gate line with a gate insulating film therebetween to define a pixel area, a thin film transistor provided adjacent to a crossing of the gate line and the data line, a common electrode provided in the pixel area and connected to the common line, a pixel electrode connected to the thin film transistor and provided in such a manner to form a horizontal electric field along with the common electrode in the pixel area on the same plane as the common electrode, a storage capacitor electrode overlapping the common electrode to provide a storage capacitor, and a contact electrode contacting the pixel electrode, the thin film transistor and the storage electrode at their side surfaces.

In another aspect, a method of fabricating a horizontal electric field switching liquid crystal display device includes forming a first conductive pattern group including a gate line, a gate electrode, a lower gate pad electrode, a common line, a common electrode, a lower common pad electrode and a pixel electrode on a substrate, forming a gate insulating film for covering the first conductive pattern group, forming a semiconductor pattern on the gate insulating layer and a second conductive pattern group on the semiconductor pattern, the second conductive pattern group including a source electrode, a lower data pad electrode, a drain electrode and an storage electrode extending from the drain electrode, forming a protective film on the gate insulating film and over the second conductive pattern group and the semiconductor pattern, forming a contact hole passing through the protective film and the gate insulating film, forming a third conductive pattern group including a contact electrode contacting the drain electrode and the pixel electrode at their side surfaces, and contacts to the gate pad electrode, an upper data pad electrode and an upper common pad electrode.

In another aspect, a horizontal electric field switching liquid crystal display device includes a gate line, a common line parallel to the gate line and provided at an area adjacent to the gate line, a data line crossing the gate line with a gate insulating film therebetween to define a pixel area, a thin film transistor provided adjacent to a crossing of the gate line and the data line, a common electrode in the pixel area and connected to the common line, a pixel electrode connected to the thin film transistor and provided in such a manner to form a horizontal electric field along with the common electrode in the pixel area on the same plane as the common electrode, a first storage capacitor including the common electrode, a second storage capacitor including the common line and an storage electrode; and a contact electrode contacting the pixel electrode, the thin film transistor and the storage electrode at their side surfaces.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 3A to FIG. 3D are cross-sectional views showing stages for a method of fabricating the thin film transistor array substrate shown in FIG. 1;

FIG. 5 are cross-sectional views of the thin film transistor array substrate taken along the III-III', IV-IV', V-V', VI-VI' lines in FIG. 4;

FIG. 6A and FIG. 6B are a plan view and a cross-sectional view for explaining a first mask process in a method of fabricating the thin film transistor array substrate according to the first embodiment of the present invention, respectively;

FIG. 7A and FIG. 7B are a plan view and a cross-section view for explaining a second mask process in a method of fabricating the thin film transistor array substrate according to the first embodiment of the present invention, respectively;

FIG. 9A and FIG. 9B are a plan view and a cross-sectional view for explaining a fourth mask process in a method of fabricating the thin film transistor array substrate according to the first embodiment of the present invention, respectively;

FIG. 10A and FIG. 10B are a plan view and a cross-sectional view for explaining a first mask process in a method of fabricating the thin film transistor array substrate according to a second embodiment of the present invention, respectively;

FIG. 11A and FIG. 11B are a plan view and a cross-sectional view for explaining a second mask process in a method of fabricating the thin film transistor array substrate according to the second embodiment of the present invention, respectively;

FIG. 12A and FIG. 12B are a plan view and a cross-sectional view of the thin film transistor array substrate of a horizontal electric field LCD after a third mask process in a method of fabricating the thin film transistor array substrate according to the second embodiment of the present invention, respectively; and FIG. 13A to FIG. 13D are cross-sectional views for explaining a third mask process in a method of fabricating the thin film transistor array substrate according to the second embodiment of the present invention.

DETAILED DESCRIPTION OF THE PREFERRED EMBODIMENTS

Hereinafter, the preferred embodiments of the present invention will be described in detail with reference to FIG. 4 to FIG. 13D.

Figure 1:
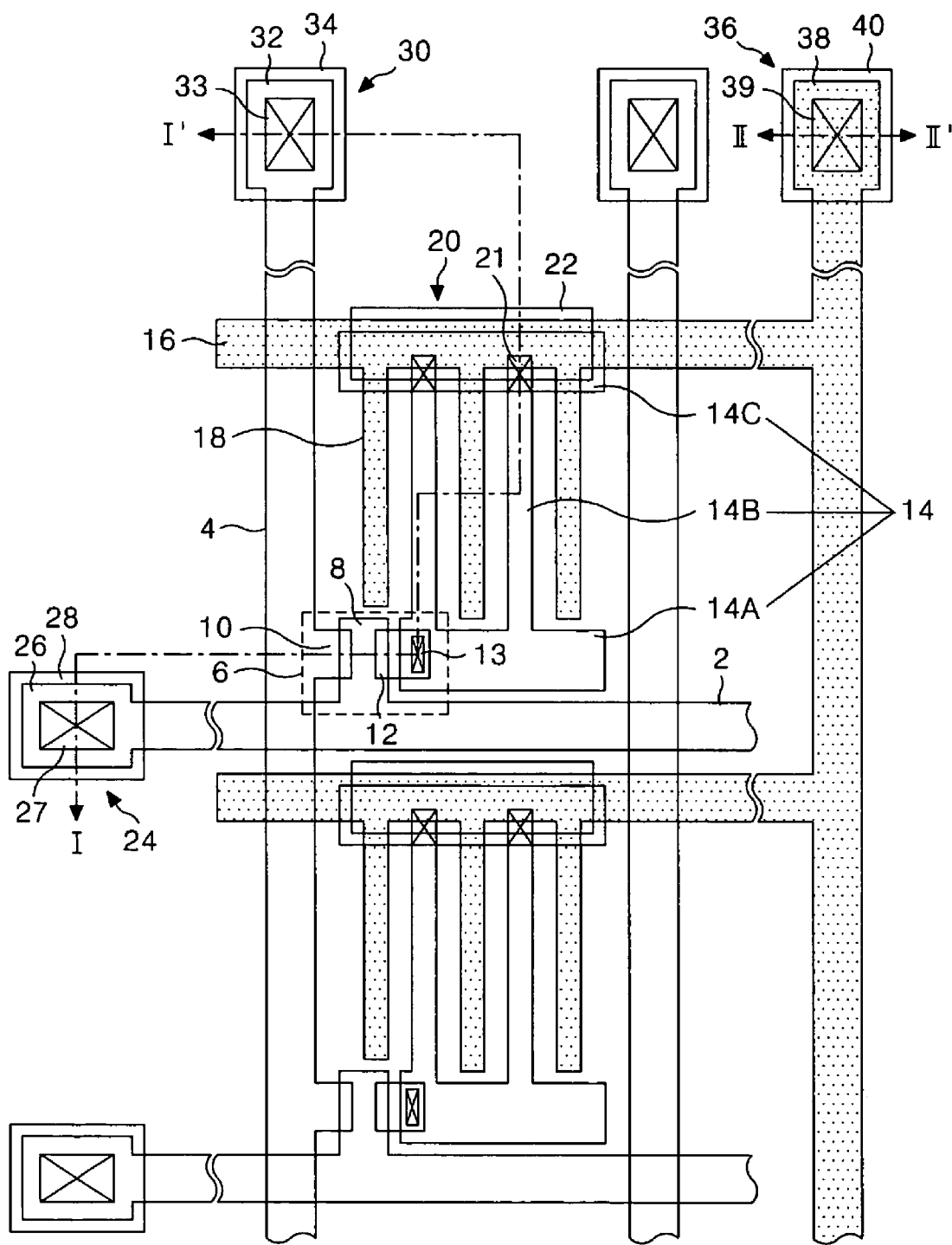
FIG. 1 is a plan view showing a portion of a thin film transistor array substrate of an IPS mode liquid crystal display device formed by a related art four-round mask process.
Figure 2:
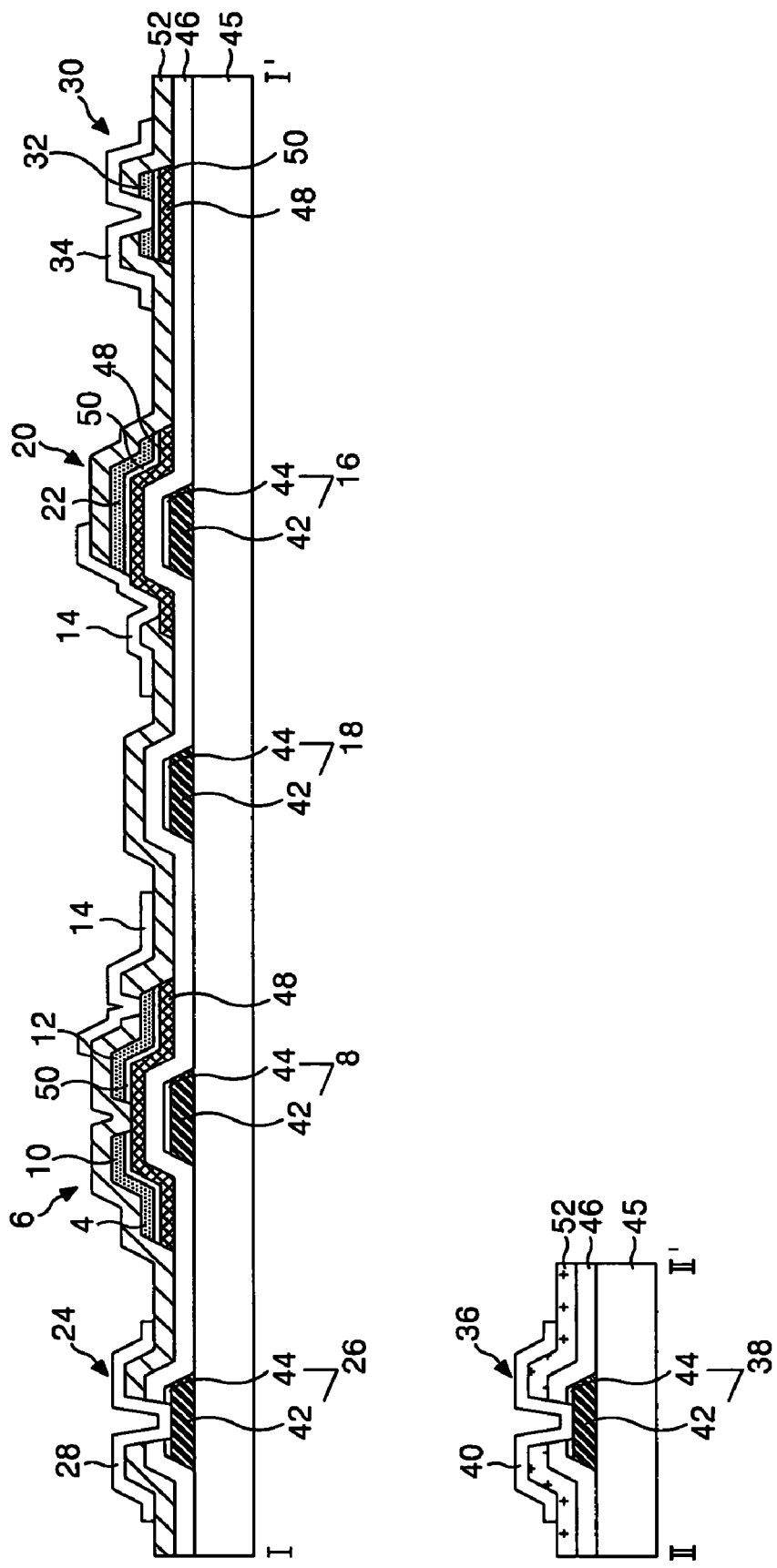
FIG. 2 is a cross-sectional view of the thin film transistor array substrate along the lines I-I' and II-II' in FIG. 1.
Figure 3A:
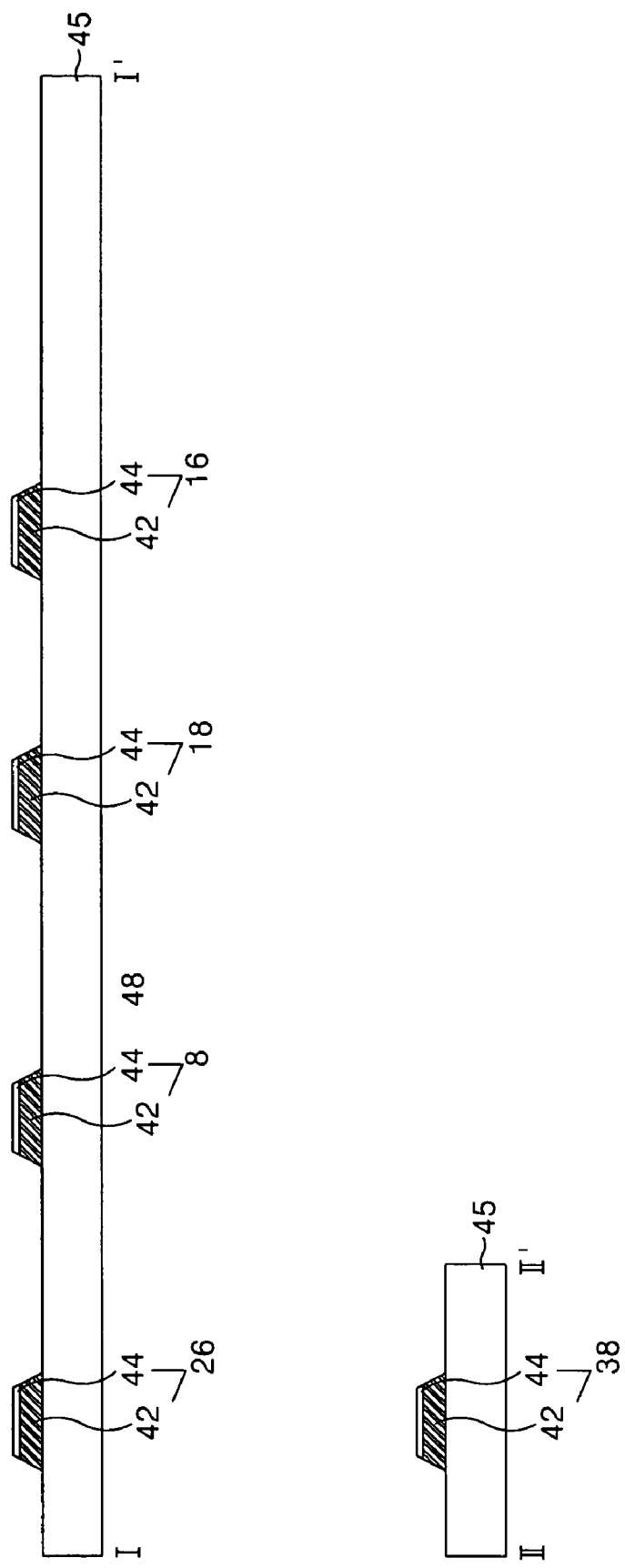
Figure 3C:
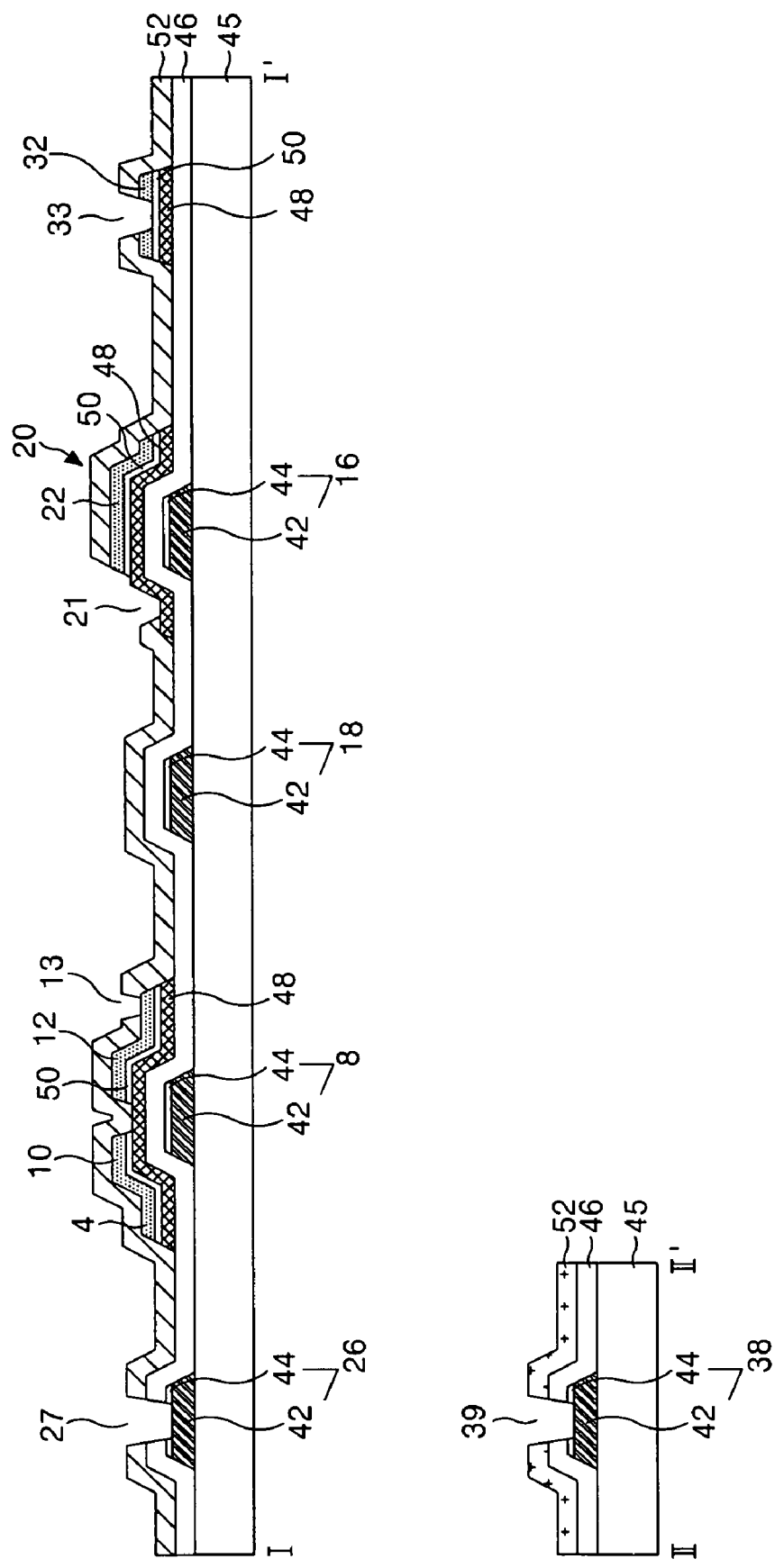
Figure 3D:
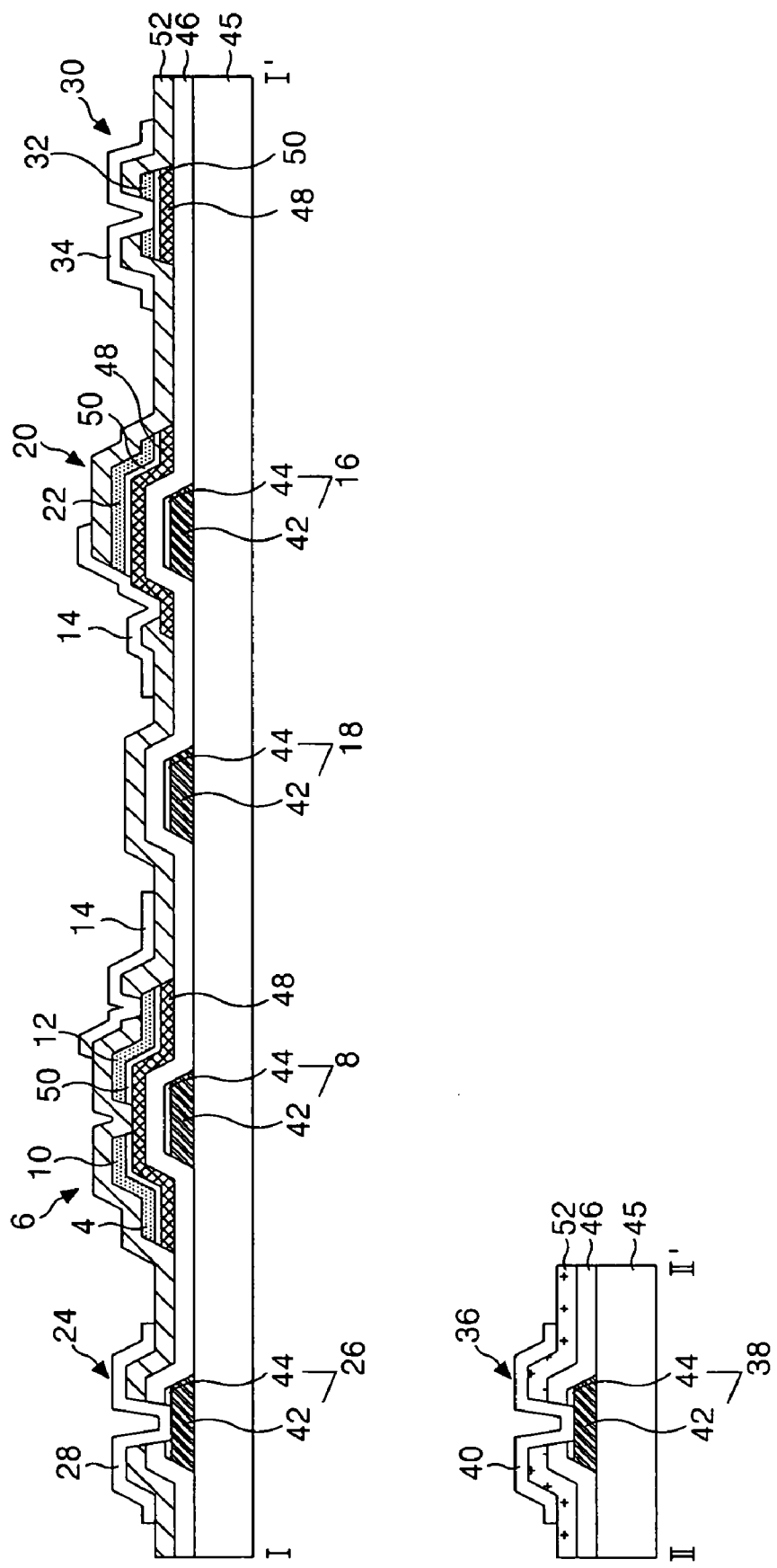
Figure 4:
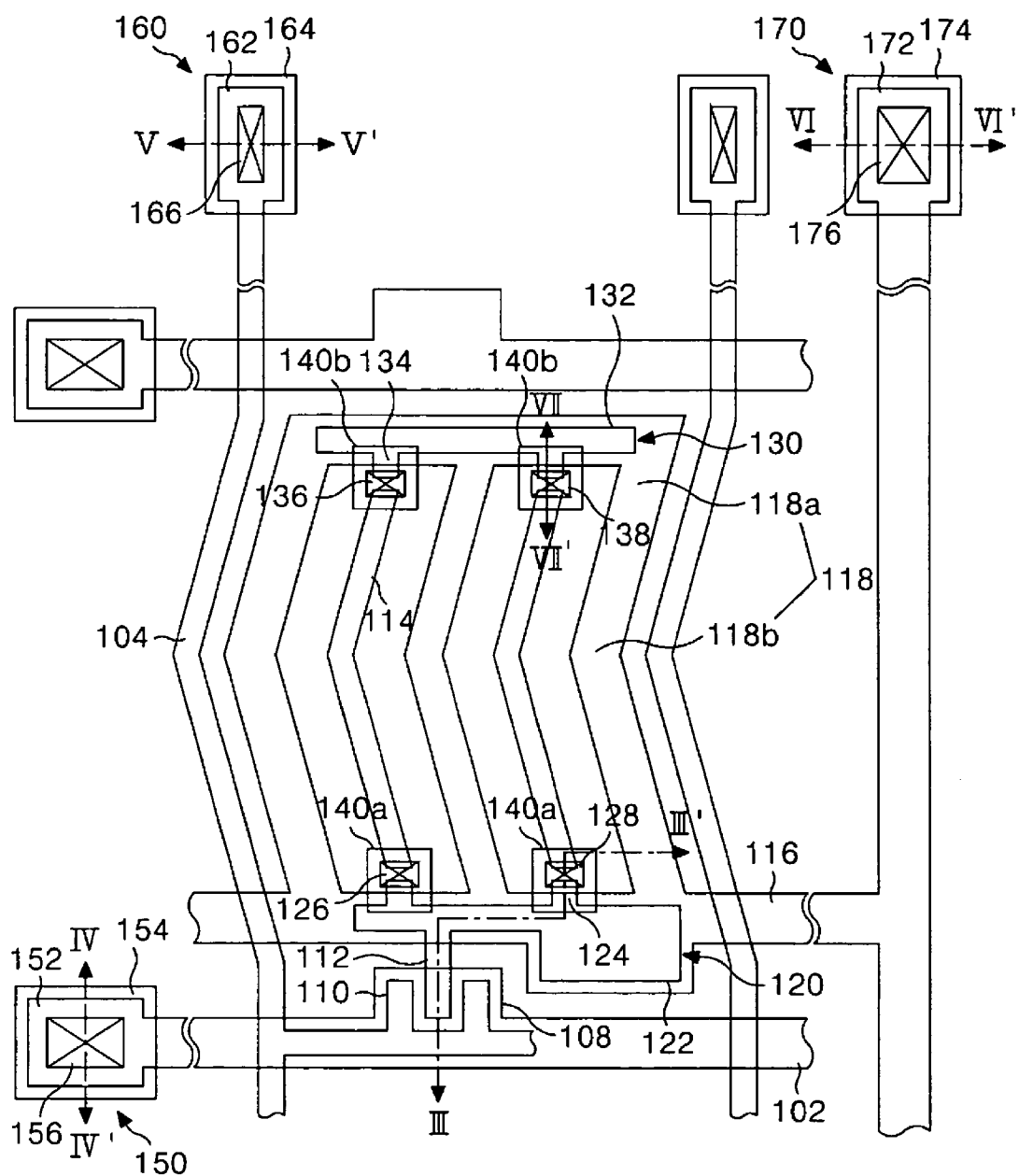
FIG. 4 is a plan view showing a portion of a thin film transistor array substrate of a horizontal electric field switching liquid crystal display device according to a first embodiment of the present invention.

FIG. 4 is a plan view showing a portion of a thin film transistor array substrate of a horizontal electric field switching liquid crystal display device according to a first embodiment of the present invention, and FIG. 5 are cross-sectional views of the thin film transistor array substrate taken along lines III-III', IV-IV', V-V', VI-VI' and VII-VII' in FIG. 4. Referring to FIG. 4 and FIG. 5, a thin film transistor array substrate according to a first embodiment of the present invention includes a gate line 102 and a data line 104 provided in such a manner as to cross each other on a lower substrate 145 and having a gate insulating film 146 therebetween to define a pixel area, a thin film transistor provided adjacent to where the gate line 102 and data line 104 cross, a pixel electrode 114 and a common electrode 118 provided in such a manner as to form a horizontal electric field in the pixel area, and a common line 116 connected to a common electrode 118. The thin film transistor array substrate further includes a first and second upper storage electrodes 122 and 132 respectively overlapping portions of a horizontal common electrode line 116 and a common line 118, a gate pad 150 extending from a gate line 102, a data pad 160 extending from a data line 104, and a common pad 170 extending from a common line 116.

The gate line 102 is for supplying a gate signal and the data line 104 is for supplying a data signal. The data line 104 is "V" shaped and has an oblique line image that is bent so as to have vertical symmetry with a center of the pixel area. The common line 116 is for supplying a reference voltage to drive the liquid crystal display, and is formed to be parallel to the gate line 102 and spaced a pre-designated distance from the gate line 102.

The thin film transistor allows a pixel signal applied to the data line 104 to be charged onto the pixel electrode 114 while a scanning signal is applied to the gate line 102. The thin film transistor includes a gate electrode 108 connected to the gate line 102, a source electrode 110 connected to the data line 104 and a drain electrode 112 connected to the pixel electrode 114. The source electrode 110 is "U" shaped so as to partially enclose the drain electrode 112. The drain electrode 112 is connected to pixel electrodes 114 through a contact electrode 140. The thin film transistor also includes an active layer 148 overlapping the gate electrode 108 with a gate insulating film 146 therebetween. A portion of the active layer 148 includes a channel between the source electrode 110 and the drain electrode 112. Other portions of the active layer 148 are provided in such a manner as to be overlapped by the data line 104, the data pad 160, and a first and second upper storage electrode 122 and 132. The data line 104, the drain electrode 112, the data pad 160, and the ohmic contact layer 147 for making an ohmic contact with the first and second upper storage electrode 122 and 132 are provided on such portions of the active layer 148.

The common electrode 118 is connected to the common electrode line 116 and is formed in the pixel area. The common electrode 118 includes a horizontal portion 118A provided in parallel to the gate line 102 between the gate line 102 and the pixel area, and vertical portions 118B protruding from the horizontal portions 118A. The vertical portions 118B of the common electrode 118 are "V" shaped lines spaced apart from and corresponding to the data line 104. The pixel electrodes 114 have "V" shaped lines spaced apart from and corresponding to the data line 104. The pixel electrodes 114 are connected, via a first and second contact hole 126 and 128 passing through the gate insulating film 146 and the protective film 144, to the drain electrode 112 of the thin film transistor. The pixel electrodes 114 and the vertical portions 118B of the common electrode 118 are interleaved and form a slit pattern type in which the pixel area is divided into two areas having slits in different directions.

A horizontal electric field can be formed between the pixel electrode 114 supplied with a pixel signal, via the thin film transistor 106, and the common electrode 118 supplied with a reference voltage, via the common line 116. More particularly, a horizontal electric field is formed between the pixel electrode 114 and the common electrode 118. Liquid crystal molecules arranged in the horizontal direction between the thin film transistor array substrate and the color filter array substrate by such a horizontal electric field are rotated due to a dielectric anisotropy of the liquid crystal molecules. Transmittance of a light transmitted through the pixel area is differentiated depending upon the rotation extent of the liquid crystal molecules, thereby implementing an image.

A first storage capacitor 120 overlaps the common electrode line 116. The first storage electrode 122 integral with the drain electrode 114 and overlapping the ohmic contact layer 147, the active layer 148, and the gate insulating film 146 above the common electrode line 116. The first storage electrode 122 includes a first auxiliary storage electrodes 124 protruding from the first storage electrode 122 in such a manner as to oppose the pixel electrode 114 so as to be connected to the pixel electrode 114.

The second storage capacitor 130 includes the second upper storage electrode 132 overlaps the horizontal portion 118A of the common electrode 118 with the ohmic contact layer 147, the active layer 148, and the gate insulating film 146 therebetween. Herein, a second upper storage electrode 132 includes a second auxiliary storage electrodes 134 protruding from the second upper storage electrode 132 in such a manner as to oppose the pixel electrode 114 so as to be connected, via third and fourth contact holes 136 and 138, to the pixel electrode 114. Such first and second storage capacitors 120 and 130 allow a pixel signal charged onto the pixel electrode 114 to be stably maintained until the next signal is charged. The contact electrodes 140a and 140b allows the first and second storage electrode 122 and 132, and the pixel electrodes 114 to be connected to each other at their side surfaces, which are at the edges of these layers. Thus, a contact electrode 140a contacts the side surface at the edge of the first storage electrode 122 and the side surface at the first edge of the pixel electrode 114, and another contact electrode 140b contacts the side surface at the edge of the second storage electrode 132 and the side surface at the second edge of the pixel electrode 114.

The gate line 102 supplies a gate signal to the gate electrode 108 of the thin film transistor. The gate line 102 is connected, via the gate pad 150, to a gate driver (not shown). The gate pad 150 includes a lower gate pad electrode 152 connected to the gate line 102 and an upper gate pad electrode 154 connected to the lower gate pad electrode 152 through a fifth contact hole 156 exposing the lower gate pad electrode 152.

The data line 104 supplies a pixel signal, via the drain electrode 112 of a thin film transistor, to the pixel electrode 114. Such data line 104 is connected, via a data pad 160, to a data driver (not shown). The data pad 160 includes a lower data pad electrode 162 connected to the data line 104, and an upper data pad electrode 164 connected to a lower data pad electrode 162 through a sixth contact hole 166 exposing the lower data pad electrode 162.

The common line 116 supplies a reference voltage to the common electrode 118 for driving the liquid crystal molecules. Such a common line 116 is connected, via a common pad 170, to a power supply (not shown). The common pad 170 includes a lower common pad electrode 172 connected to the common line 116, and an upper common pad electrode 174 connected to the lower common pad electrode 172 through a seventh contact hole 176 exposing the lower common pad electrode 172.

Figure 6A:
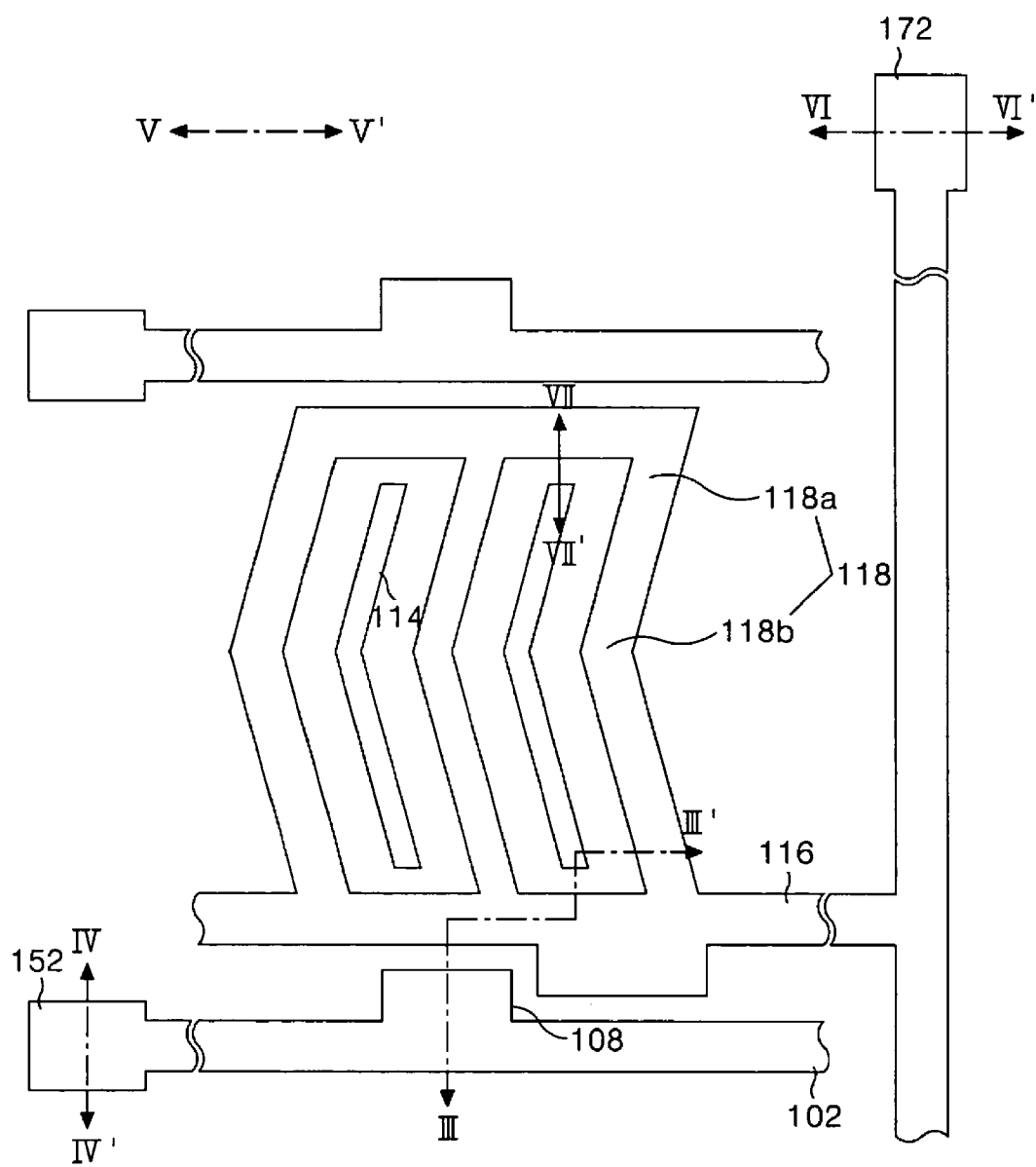

FIG. 6A to FIG. 9B are diagrams for explaining a method of fabricating the thin film transistor array substrate of horizontal electric field LCD according to the first embodiment of the present invention. FIG. 6A and FIG. 6B are a plan view and a cross-sectional view for explaining a first mask process in a method of fabricating the thin film transistor array substrate according to the first embodiment of the present invention, respectively. Referring to FIG. 6A and FIG. 6B, a first conductive pattern group including the gate line 102, the gate electrode 108, the lower gate pad electrode 152, the common line 116, the common electrode 118, the lower common pad electrode 172 and the pixel electrode 114 is formed on the lower substrate 145 using a first mask process. More particularly, a gate metal layer is formed on the lower substrate 145 by a deposition technique, such as the sputtering. The gate metal layer can be formed of one of an Al-family metal, copper (Cu) and Chrome (Cr). Next, the gate metal layer is patterned by a photolithography process and an etching process using the first mask, thereby providing the first conductive pattern group including the gate line 102, the gate electrode 108, the lower gate pad electrode 152, the common line 116, the common electrode 118, the lower common pad electrode 172 and the pixel electrode 114.

Figure 7A:
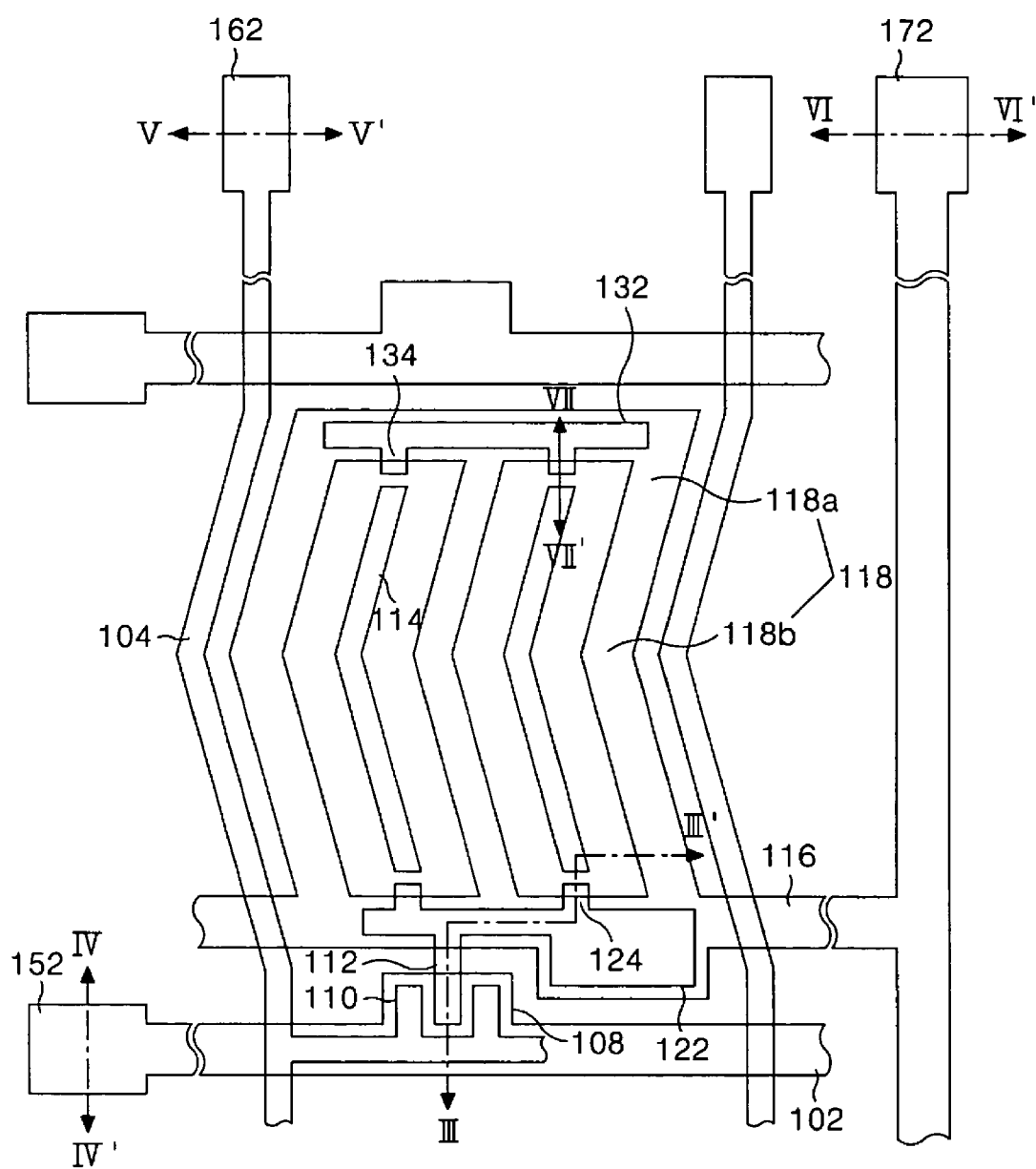

FIG. 7A and FIG. 7B are a plan view and a cross-section view for explaining a second mask process in a method of fabricating the thin film transistor array substrate according to the first embodiment of the present invention, respectively. Referring to FIG. 7A and FIG. 7B, the gate insulating film 146 is coated onto the lower substrate 145 having the first conductive pattern group. A semiconductor pattern including the active layer 148 and the ohmic contact layer 147, and a second conductive pattern group including the data line 104, the source electrode 110, the drain electrode 112, the lower data pad electrode 162 and the first and second upper storage electrodes 122 and 132 integral with the first and second auxiliary storage electrodes 124 and 134 are formed on the gate insulating film 146 using a second mask process. More particularly, the gate insulating film 146, an amorphous silicon layer, an amorphous silicon layer doped with n+ impurities and a source/drain metal layer are sequentially formed on the lower substrate 145 provided with the first conductive pattern group by a deposition techniques, such as PECVD or sputtering. The gate insulating film 146 is formed from an inorganic insulating material, such as silicon oxide ($SiO_x$) or silicon nitride ($SiN_x$). The source/drain metal is formed of one of molybdenum (Mo), titanium (Ti), tantalum (Ta) and Mo-alloy.

Next, a photo-resist pattern is formed on the source/drain metal layer by a photolithography process using the second mask. In this case, the second mask uses a diffractive exposure mask having a diffractive exposure portion corresponding to channel of the thin film transistor. The diffractive exposure portion of the photo-resist pattern has a lower height than other portions of the photo-resist pattern.

Next, the source/drain metal layer is patterned by a wet-etching process using the photo-resist pattern, thereby providing a second conductive pattern group including the data line 104, the drain electrode 112, the source electrode 110 having a "U" shaped electrode partially enclosing the drain electrode 112, the first storage electrode 122 integral to the drain electrode 110 and the second upper storage electrode 132.

Subsequently, the amorphous silicon layer doped with n+ impurities and the amorphous silicon layer are simultaneously patterned by a dry-etching process using the same photo-resist pattern, thereby providing the ohmic contact layer 147 and the active layer 148. Then, the diffractive exposure portion at the channel is removed by an ashing process. Next, the source/drain metal pattern and the ohmic contact layer 147 of the channel are etched by a dry-etching process. Accordingly, the active layer 148 of the channel is exposed so that the source electrode 110 and the drain electrode 112 are separated from each other. Next, the photo-resist pattern left on the second conductive pattern group is removed by a stripping process.

Figure 8A:
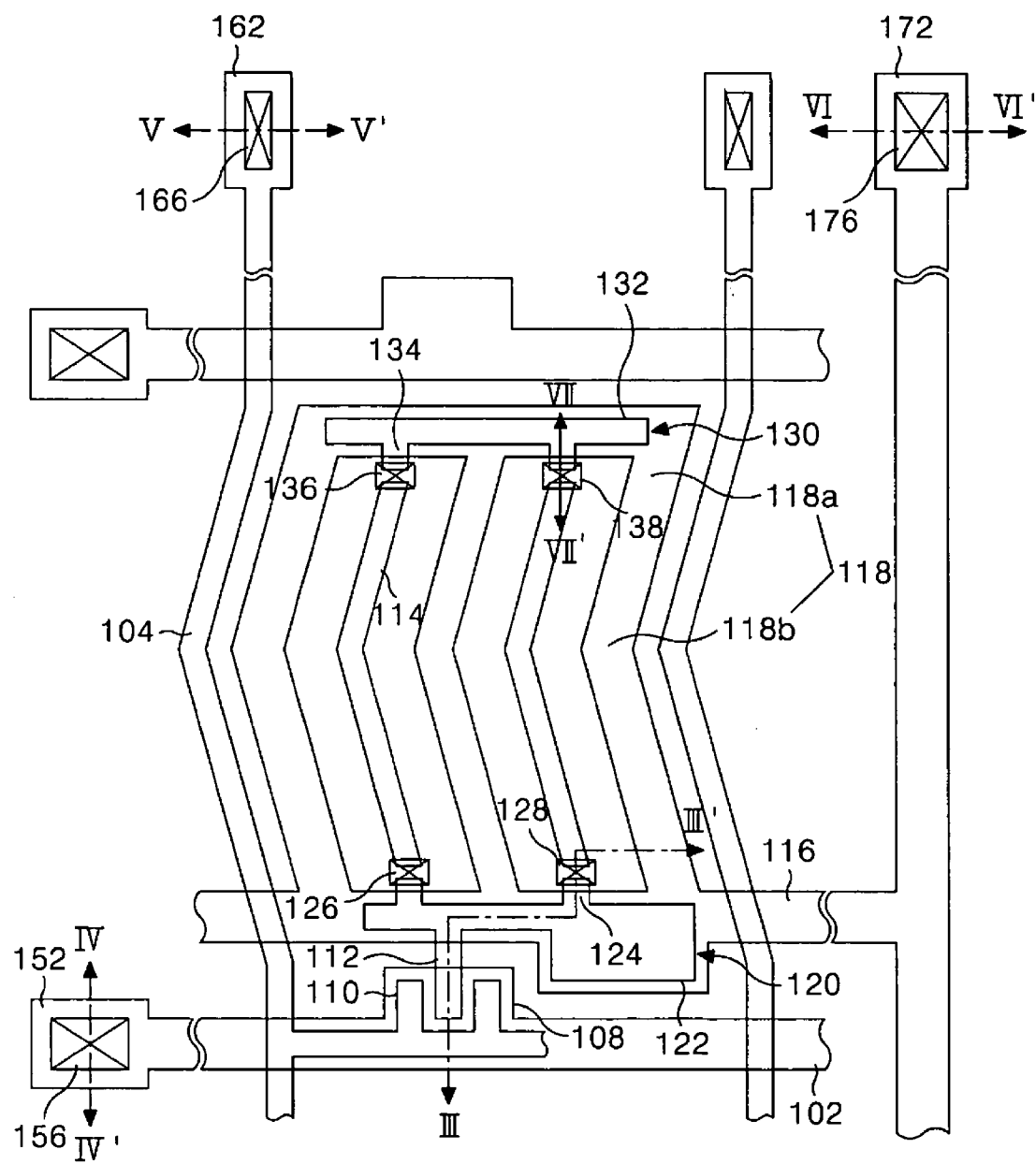
FIG. 8A and FIG. 8B are a plan view and a cross-sectional view for explaining a third mask process in a method of fabricating the thin film transistor array substrate according to the first embodiment of the present invention, respectively.
Figure 8B:
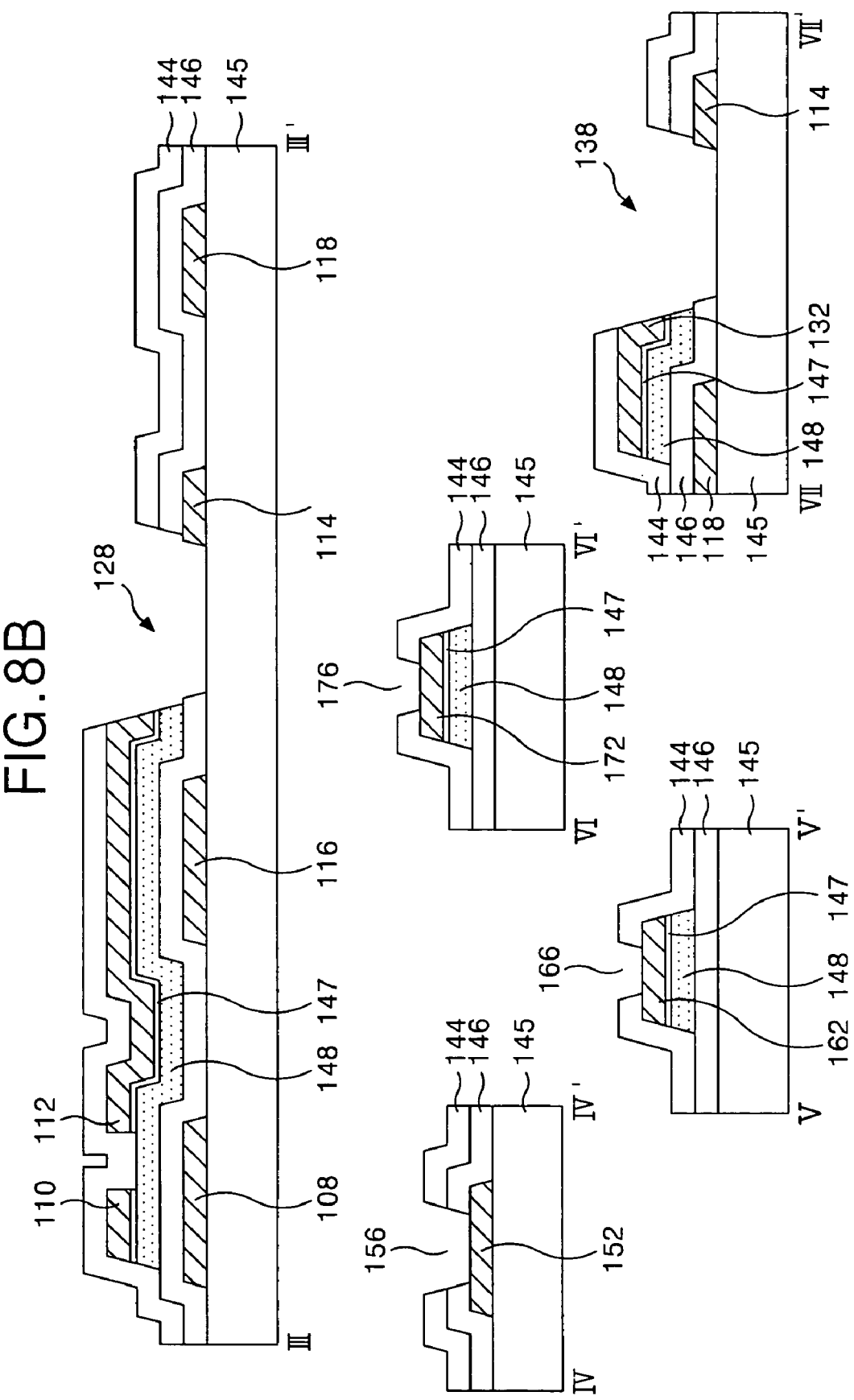

FIG. 8A and FIG. 8B are a plan view and a cross-sectional view for explaining a third mask process in a method of fabricating the thin film transistor array substrate according to the first embodiment of the present invention, respectively. Referring to FIG. 8A and FIG. 8B, the protective film 144 including first to seventh contact holes 126, 128, 136, 138, 156, 166 and 176 is formed on the gate insulating film 146 having the second conductive pattern group formed by the third mask process. More particularly, the protective film 144 is formed over the gate insulating film 146 on the second conductive pattern group by a deposition technique, such as PECVD. Next, the protective film 144 is patterned by a photolithography process and an etching process using the third mask, thereby providing the first to seventh contact holes 126, 128, 136, 138, 156, 166 and 176.

The first and second contact holes 126 and 128 pass through the protective film 144 and the gate insulating film 146 to expose side surfaces of the pixel electrode 114 and the first storage electrode 122. The third and fourth contact holes 136 and 138 pass through the protective film 144 and the gate insulating film 146 to expose the side surfaces of the pixel electrode 114 and the second upper storage electrode 132. The fifth contact hole 156 passes through the protective film 144 and the gate insulating film 146 to expose the lower gate pad electrode 152. The sixth contact hole 166 passes through the protective film 144 to expose the lower data pad electrode 162. The seventh contact hole 176 passes through the protective film 144 and the gate insulating film 146 to expose the lower common pad electrode 172. The protective film 144 is made from an inorganic insulating material identical to the gate insulating film 146, or an organic insulating material, such as an acrylic organic compound having a small dielectric constant, benzocyclobutene (BCB) or perfluorocyclobutane (PFCB).

Figure 9A:
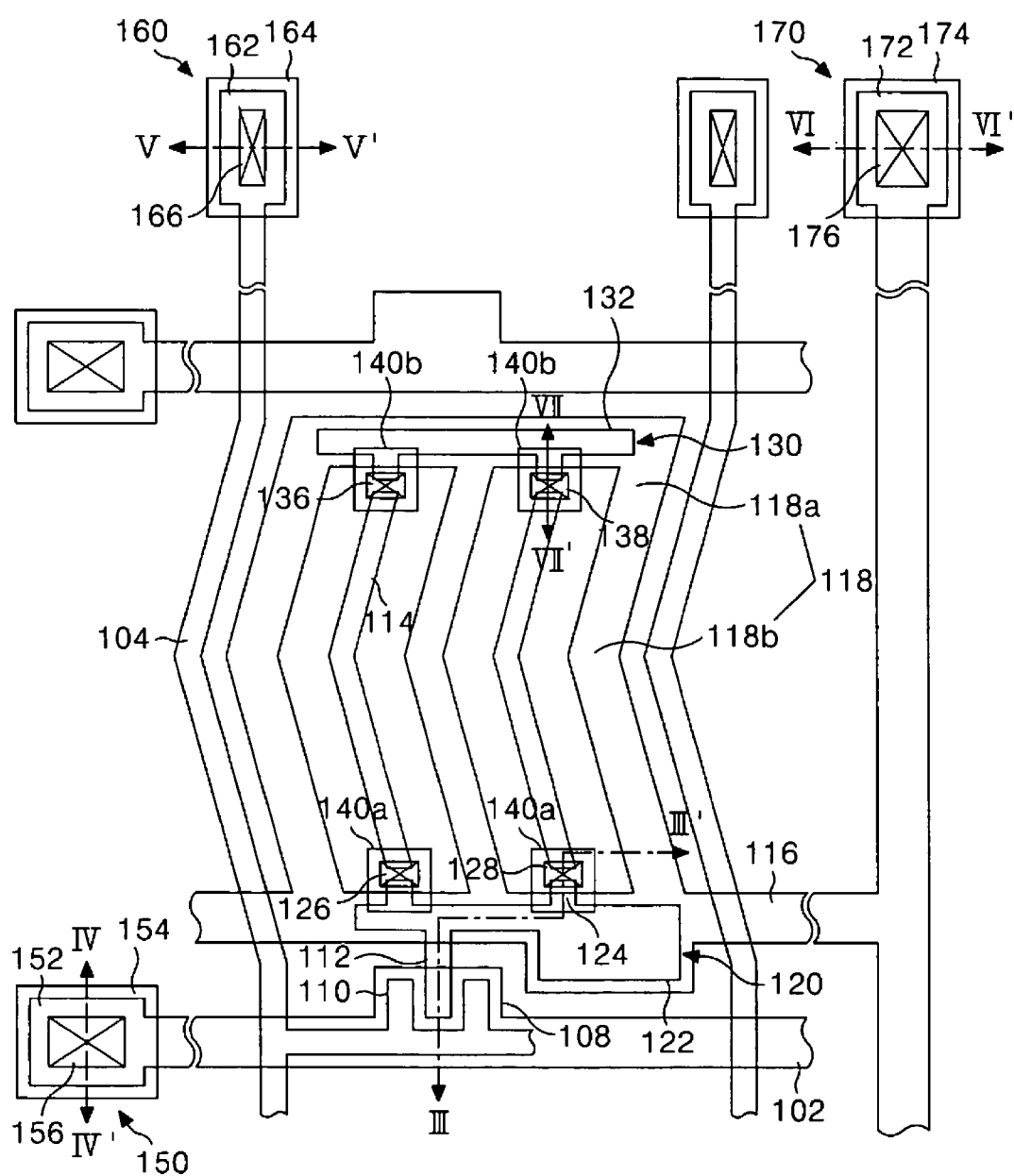

FIG. 9A and FIG. 9B are a plan view and a cross-sectional view for explaining a fourth mask process in a method of fabricating the thin film transistor array substrate according to the first embodiment of the present invention, respectively. Referring to FIG. 9A and FIG. 9B, a third conductive pattern group including the contact electrode 140, the upper gate pad electrode 154, the upper data pad electrode 164 and the upper common pad electrode 174 is formed on the protective film 144 by the fourth mask process. More particularly, a conductive layer is coated onto the protective film 144 by a deposition technique, such as sputtering.

Next, the conductive layer is patterned by a photolithography process and an etching process using the fourth mask, thereby providing the third conductive pattern group including the contact electrodes 140, the upper gate pad electrode 154, the upper data pad electrode 164 and the upper common pad electrode 174. One of the contact electrodes 140a connects the first storage electrode 122 (integral to the drain electrode 112) with the pixel electrode 114 at their side surfaces in the first and second contact holes 126 and 128. The other contact electrode 140b connects the second upper storage electrode 132 and the pixel electrode 114 at their side surfaces in the third and fourth contact holes 136 and 138. The upper gate pad electrode 154 is electrically connected, in the fifth contact hole 156, to the lower gate pad electrode 152. The upper data pad electrode 164 is electrically connected, in the sixth contact hole 166, to the lower data pad electrode 162. The upper common pad electrode 174 is electrically connected, in the seventh contact hole 176, to the lower common pad electrode 172. The conductive layer can be made of a material having a conductive property and crossing step coverage, such as one of Indium Tin Oxide (ITO), Tin Oxide (TO) and Indium Zinc Oxide (IZO), Titanium (Ti), AlNd, molybdenum Mo and titanium-molybdenum alloy.

FIG. 10A to FIG. 13B are diagrams for explaining a method of fabricating the thin film transistor array substrate of a horizontal electric field LCD according to a second embodiment of the present invention. The plan view and cross-sectional view of the thin film transistor array substrate of horizontal electric field LCD according to the second embodiment of the present invention are the same as the first embodiment. Therefore, an explanation as to the same elements will be omitted and only a method of fabricating will be described. But, the second embodiment of the present invention has a difference from the first embodiment of the present invention in that the contact electrode 140, the upper gate pad electrode 154, the upper data pad electrode 164 and the upper common pad electrode 174 are the same size as a contact hole or smaller than the size of the contact hole. This principle will be further described in the method of fabricating the thin film transistor array substrate of horizontal electric field LCD according to the second embodiment of the present invention.

Figure 10A:
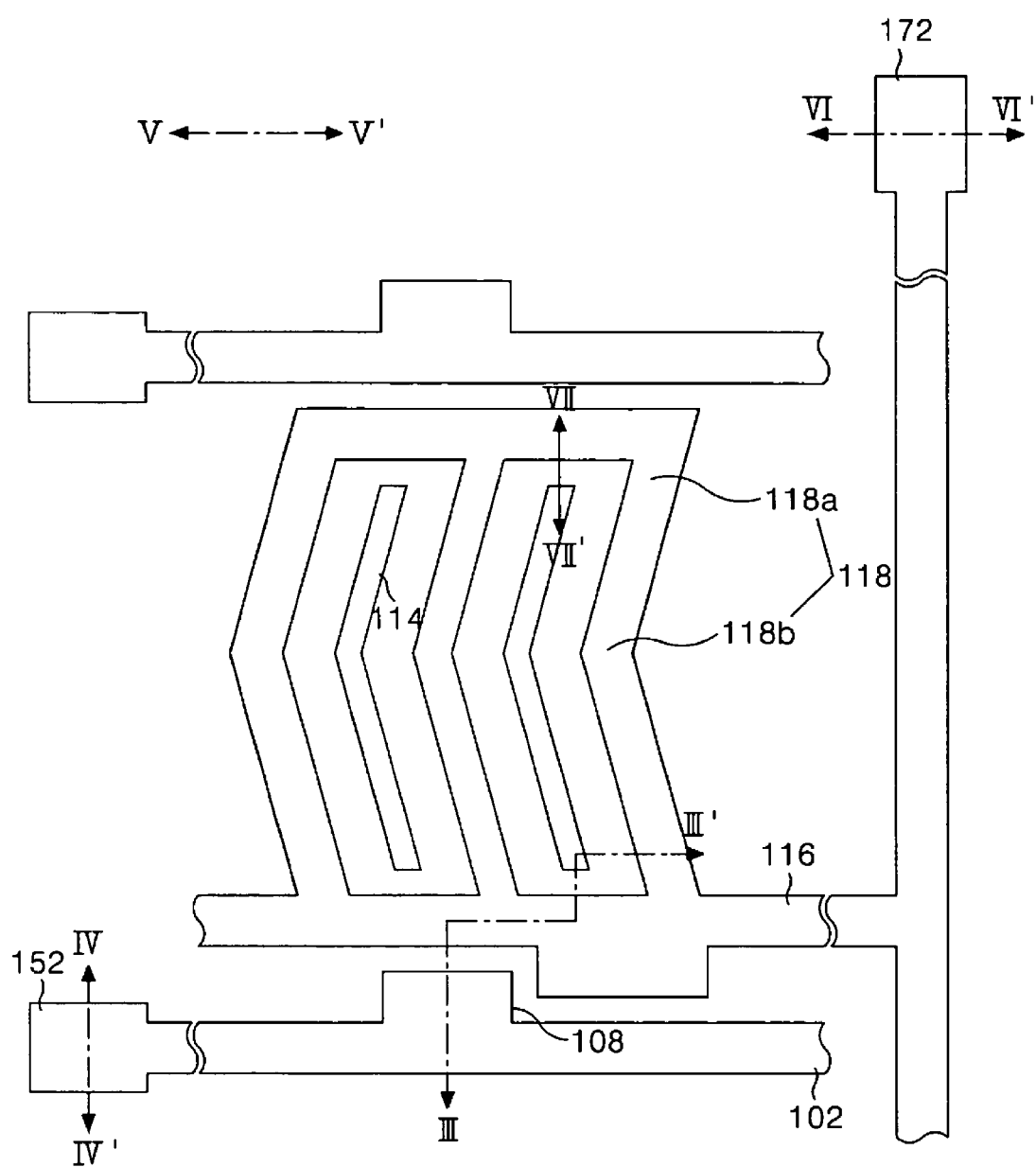

FIG. 10A and FIG. 10B are a plan view and a cross-sectional view for explaining a first mask process in a method of fabricating the thin film transistor array substrate according to the second embodiment of the present invention, respectively. Referring to FIG. 10A and FIG. 10B, a first conductive pattern group including the gate line 102, the gate electrode 108, the lower gate pad electrode 152, the common line 116, the common electrode 118, the lower common pad electrode 172 and the pixel electrode 114 is formed on the lower substrate 145 using a first mask process. More particularly, a gate metal layer is formed on the lower substrate 145 by a deposition technique, such as sputtering. The gate metal layer can be formed of one of an Al-family metal, copper (Cu) and Chrome Cr. Next, the gate metal layer is patterned by a photolithography process and an etching process using the first mask, thereby providing the first conductive pattern group including the gate line 102, the gate electrode 108, the lower gate pad electrode 152, the common line 116, the common electrode 118, the lower common pad electrode 172 and the pixel electrode 114.

Figure 11A:
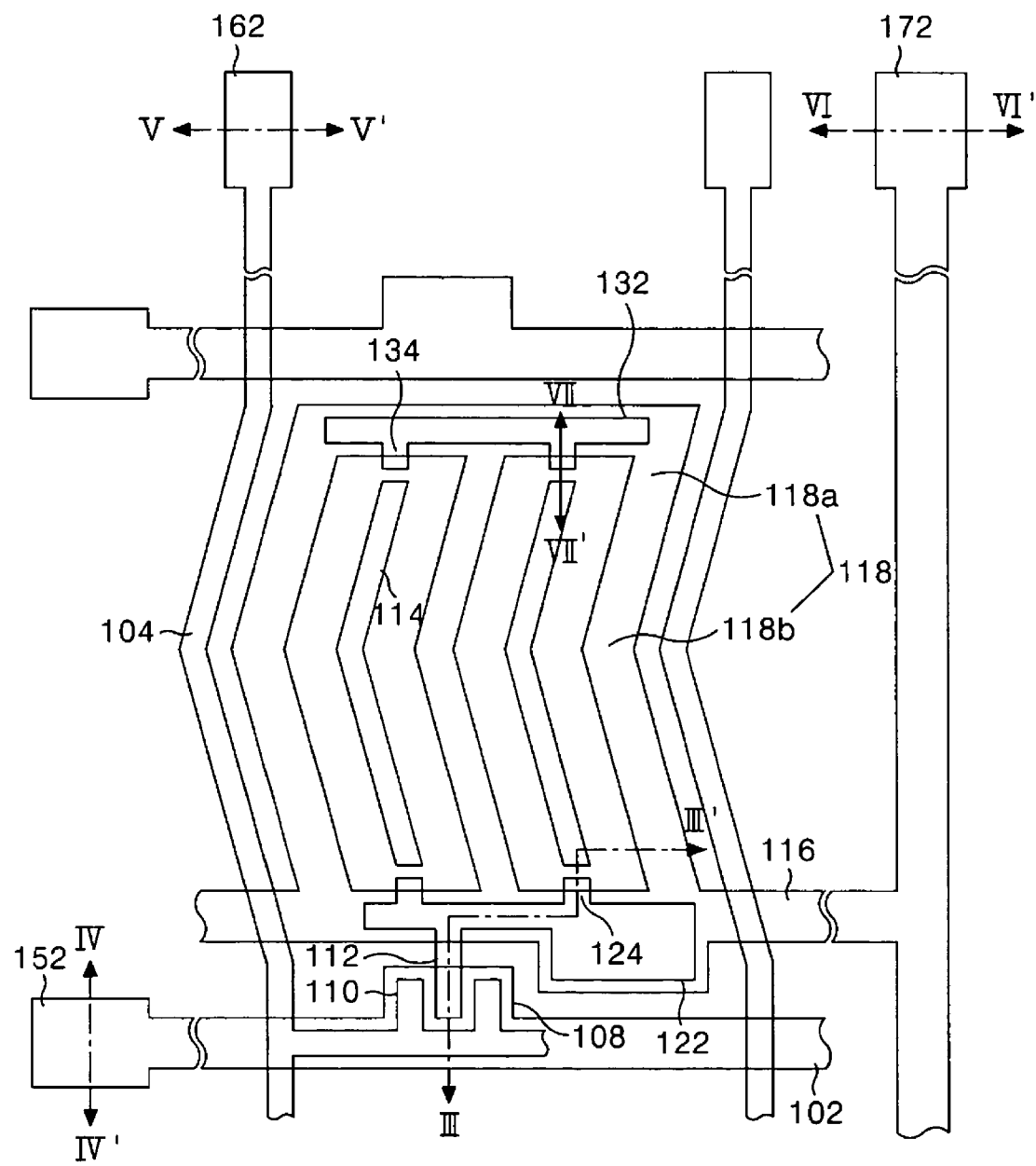

FIG. 11A and FIG. 11B are a plan view and a cross-sectional view for explaining a second mask process in a method of fabricating the thin film transistor array substrate according to the second embodiment of the present invention, respectively. Referring to FIG. 11A and FIG. 11B, the gate insulating film 146 is provided on the lower substrate 145 having the first conductive pattern group. A semiconductor pattern, including the active layer 148 and the ohmic contact layer 147, and a second conductive pattern group including the data line 104, the source electrode 110, the drain electrode 112, the lower data pad electrode 162 and the first and second upper storage electrode 122 and 132 (respectively integral to the first and second auxiliary storage electrodes 124 and 134) are formed on the gate insulating film 146 using the second mask process. More particularly, the gate insulating film 146, an amorphous silicon layer, an amorphous silicon layer doped with n+ impurities and a source/drain metal layer are sequentially formed on the lower substrate 145 having the first conductive pattern group by a deposition technique, such as PECVD or sputtering. The gate insulating film 146 is formed from an inorganic insulating material, such as silicon oxide ($SiO_x$) or silicon nitride ($SiN_x$). The source/drain metal is formed of one of molybdenum (Mo), titanium (Ti), tantalum (Ta) and Mo-alloy.

Next, a photo-resist pattern is formed on the source/drain metal layer by a photolithography process using the second mask. The second mask employs a diffractive exposure mask having a diffractive exposure portion corresponding to the channel of the thin film transistor. The diffractive exposure portion has a lower height than other portions of the diffractive exposure mask.

Next, the source/drain metal layer is patterned by a wet-etching process using the photo-resist pattern, thereby providing a second conductive pattern group including the data line 104, the drain electrode 112, the source electrode 110 having a "U" shape partially enclosing the drain electrode 112, the first storage electrode 122 integral to the drain electrode 110 and the second upper storage electrode 132. Then, the amorphous silicon layer doped with n+ impurities and the amorphous silicon layer are simultaneously patterned by a dry-etching process using the same photo-resist pattern, thereby providing the ohmic contact layer 147 and the active layer 148.

The diffractive exposure portion is removed by an ashing process, and then a source/drain metal pattern and the ohmic contact layer 147 of the channel are etched by the dry-etching process. Accordingly, the active layer 148 of the channel is exposed so that the source electrode 110 and the drain electrode 112 are separated each other. Next, the photo-resist pattern left on the second conductive pattern group is removed by a stripping process.

Figure 12A:
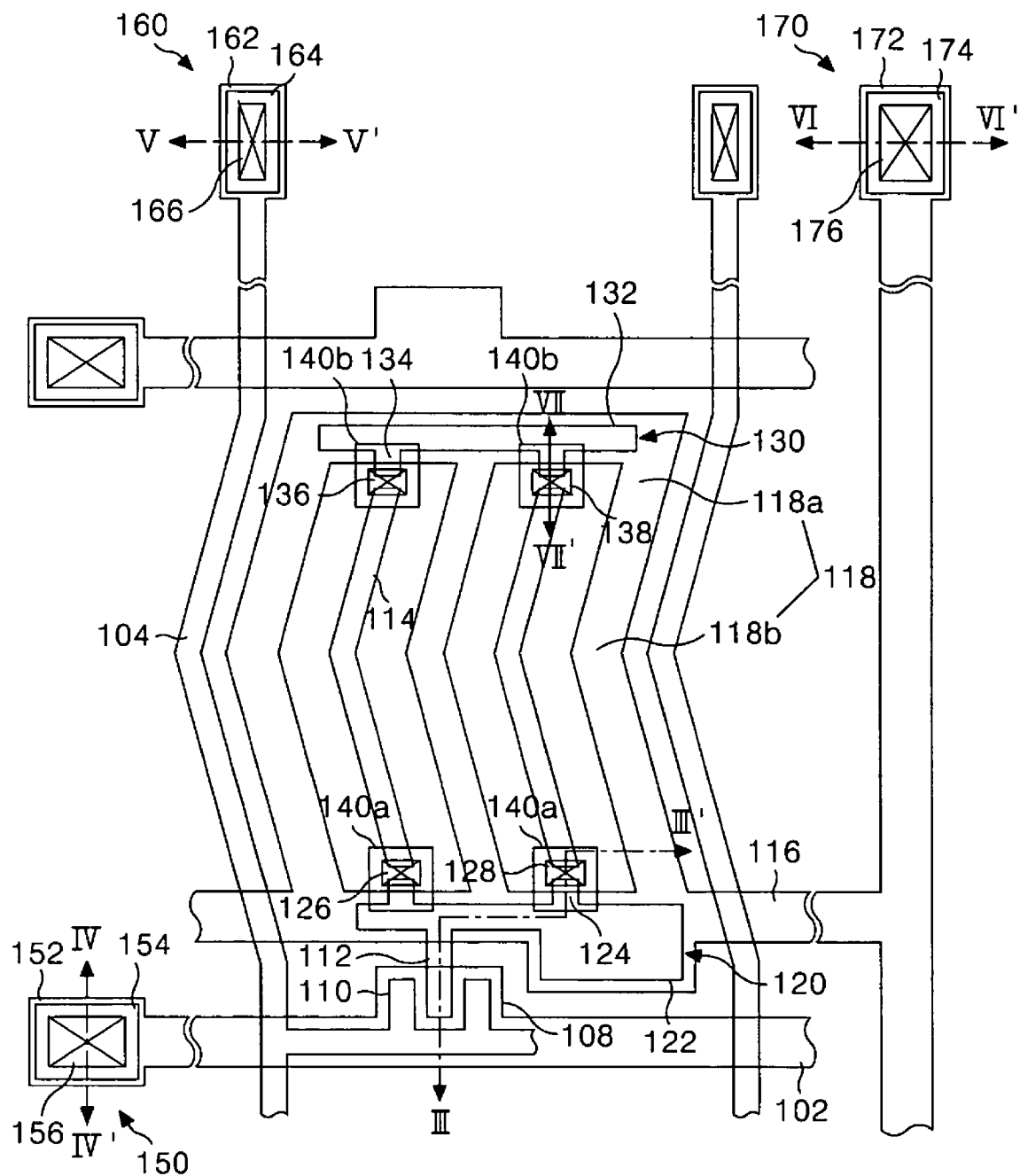

FIG. 12A and FIG. 12B are a plan view and a cross-sectional view of the thin film transistor array substrate of a horizontal electric field LCD after a third mask process in a method of fabricating the thin film transistor array substrate according to the second embodiment of the present invention, respectively. Referring to FIG. 12A and FIG. 12B, the gate insulating film and the protective film are patterned by the third mask process, thereby providing the first to seventh contact holes 126, 128, 136, 138, 156, 166 and 176, and the third conductive pattern group including the contact electrode 140, the upper gate pad electrode 154, the upper data pad electrode 164 and the upper common pad electrode 174.

FIG. 13A to FIG. 13D are cross-sectional views for explaining a third mask process in a method of fabricating the thin film transistor array substrate according to the second embodiment of the present invention. Referring to FIG. 13A, the protective film 144 is formed on the gate insulating film 146 above the second conductive pattern group by a deposition technique, such as PECVD. The protective film 144 is made from an inorganic insulating material identical to the gate insulating film 146, or an organic insulating material, such as an acrylic organic compound having a small dielectric constant, benzocyclobutene (BCB) or perfluorocyclobutane (PFCB). A photo-resist pattern 180 is then formed on portions of the protective film 144 that should later exist by a photo-lithography process using the third mask process.

Next, the protective film 144 and the gate insulating film 146 are patterned by an etching process using the photo-resist pattern 180, that is, a dry-etching process, thereby providing the first to seventh contact holes 126, 128, 136, 138, 156, 166 and 176 shown in FIG. 12B. More particularly, the first to the fourth contact holes 126, 128, 136 and 138 pass through the protective film 144 and the gate insulating film 146 to expose the side surfaces of the pixel electrode 114 and the storage electrodes 122 and 132. The fifth contact hole 156 passes through the protective film 144 and the gate insulating film 146 to be exposed the lower gate pad electrode 152. The sixth contact hole 166 passes through the protective film 144 to expose the lower data pad electrode 162. The seventh contact hole 176 passes through the protective film 144 to expose the lower common pad electrode 172. The ohmic contact layer 147 and the active layer 148 under the lower data pad electrode 162 and the lower common pad electrode 172 are etched, thereby allowing the active layer 148 left by the sixth and seventh contact holes 166 and 176 to be exposed, and the gate insulating film 146 may also be exposed.

Referring to FIG. 13B, a conductive layer 182 is formed entirely over the thin film transistor 145 having the first photo-resist pattern 180 by a deposition technique, such as sputtering. The conductive layer 182 is made from a material having a conductive property and crossing step coverage such as one of Indium Tin Oxide (ITO), Tin Oxide (TO) and Indium Zinc Oxide (IZO), a Titanium (Ti), AlNd, molybdenum (Mo) and titanium-molybdenum alloy. A second photo-resist pattern 184 is formed within the first to seventh contact holes 126, 128, 136, 138, 156, 166 and 176. In this case, the second photo-resist pattern 184 is formed by an $O_2$ plasma ashing processing after a photo-resist is formed over the entire conductive layer 182.

Next, referring to FIG. 13C, the conductive layer 182 is patterned by an etching process, such a wet etching, thereby leaving the conductive layer 182 positioned at an area that is overlapped with the second photo-resist pattern 184. The patterned conductive layer 182 is the contact electrode 140. Herein, the contact electrode 140 is formed in such a manner as to have a height above the protective film 144 because of the first photoresist film 180.

Referring to FIG. 13D, the first photo-resist pattern 180 for forming the contact holes and the second photo-resist pattern 184 for forming the contact electrode 140 are simultaneously stripped. In this case, the excess height of the contact electrode 140 above the protective film 144 is removed upon stripping of the second photo-resist pattern 184, thereby making the height of the contact electrode 140 about the same or less than the height of the protective film 144 at the edge of the contact hole. Accordingly, the upper gate pad electrode 154, the upper data pad electrode 164 and the upper common pad electrode 174 are similarly formed like the contact electrode 140 in such a manner as to have the same height as that of the protective film 144 or to have a lower height than that of the protective film 114 at the edge of the contact hole, thereby providing a third conductive pattern group.

As described-above, in a thin film transistor array substrate of horizontal electric field LCD device and a fabricating method thereof according to embodiments of the present invention, the pixel electrode 114 and the common electrode 118 are formed on the substrate 145 and are positioned in the same layer, and are side-contacted when the pixel electrode 114 and the drain electrode 112 are electrically connected. Also, the thin film transistor array substrate of horizontal electric field switching LCD and the fabricating method thereof according to embodiments of the present invention can be formed by a related art four-round mask process, and is formed by a three-round mask process, that is, a photo-resist pattern used upon forming of a contact hole leaves as it is, a photo-resist pattern is formed within a contact hole, thereby patterning a contact electrode. Accordingly, in the thin film transistor array substrate of horizontal electric field applying type according to the present invention, one mask process is eliminated, so that it becomes possible to reduce a process cost.

As described above, a horizontal electric field switching LCD device and a fabricating method thereof according to embodiments of the present invention can be formed by a four-round mask process, and a photo-resist pattern used upon forming of a contact hole leaves as it is, a photo-resist pattern is formed within a contact hole, thereby patterning a contact electrode, so that it becomes possible to eliminate one mask process. As a result, in the horizontal electric field switching LCD according to embodiments of the present invention, a thin film transistor array substrate is formed by a three-round mask process, the structure and the entire process of the thin film transistor array substrate can be simplified, so that it becomes possible to reduce a manufacturing cost as well as to improve productivity.

It will be apparent to those skilled in the art that various modifications and variations can be made in the horizontal electric field switching liquid crystal display device and a fabricating method thereof of the present invention without departing from the spirit or scope of the invention. Thus, it is intended that the present invention cover the modifications and variations of this invention provided they come within the scope of the appended claims and their equivalents.

What is claimed is:

1. A method of fabricating a horizontal electric field switching liquid crystal display device, comprising the steps of:

forming a first conductive pattern group including a gate line, a gate electrode, a lower gate pad electrode, a common line, a common electrode, a lower common pad electrode and a plurality of pixel electrodes on a substrate using a first mask process;

forming a gate insulating film for covering the first conductive pattern group;

forming a semiconductor pattern on the gate insulating layer and a second conductive pattern group on the semiconductor pattern, the second conductive pattern group including a source electrode, a lower data pad electrode, a drain electrode and first and second storage electrodes extending from the drain electrode using a second mask process;

forming a protective film on the gate insulating film and over the second conductive pattern group and the semiconductor pattern;

forming first, second, third, fourth and fifth contact holes using a third mask process;

forming a third conductive pattern group including an upper data pad electrode, an upper gate pad electrode, an upper common pad electrode, first and second contact electrodes using a fourth mask process, wherein the first, second and third contact holes are formed by passing through the protective film and the gate insulating film and the fourth and the fifth contact holes are formed by passing through the protective film, wherein the first contact hole exposes side surfaces of the first storage electrode and the pixel electrodes, wherein the second contact hole exposes side surfaces of the second storage electrode and the pixel electrodes, wherein the third contact hole exposes the lower gate pad electrode, wherein the fourth contact hole exposes the lower data pad electrode, wherein the fifth contact hole exposes the lower common pad electrode, wherein the first contact electrode contacts the first storage electrode and the pixel electrodes, wherein the second contact electrode contacts the second storage electrode and the pixel electrodes, wherein the upper data pad electrode contacts the lower data pad electrode, wherein the upper gate pad electrode contacts the lower gate pad electrode, wherein the upper common pad electrode contacts the lower common pad electrode, wherein the third conductive pattern group is formed by patterning a conductive layer by a photolithography process and an etching process using the fourth mask, and wherein a common pad includes the lower common pad electrode connected to the semiconductor pattern, and the upper common pad electrode connected to the lower common pad electrode through the fifth contact hole exposing the lower common pad electrode.

2. The method as claimed in claim 1, wherein the forming the third conductive pattern group includes:

forming a first photo-resist pattern on the protective film;

etching the protective film and the gate insulating film exposed through the first photo-resist pattern, thereby providing a contact hole;

forming a contact electrode layer on the first photo-resist pattern having the contact hole, forming a second photo-resist pattern on the contact electrode layer within the contact hole provided;

etching the contact electrode layer, thereby providing the contact electrode layer only within the contact hole; and removing the first and second photo-resist patterns by a stripping process.

3. The method as claimed in claim 2, wherein the forming the second photo-resist pattern includes ashing the second photoresist with a plasma process.

4. The method as claimed in claim 1, wherein the contact electrode is one of indium tin oxide, tin oxide and indium zinc oxide, titanium, AlNd, molybdenum and titanium-molybdenum alloy.

5. The method as claimed in claim 1, wherein the contact electrode positioned in the contact hole and has a first height that is about the same or less than a second height of the protective film at the edge of the contact hole.

6. The method as claimed in claim 1, wherein the common electrode includes a horizontal portion and a plurality of vertical portions, each vertical portion being integrally formed between the horizontal portion and the common line.

7. The method as claimed in claim 1, wherein the first storage electrode is integrally formed with the drain electrode.

8. The method as claimed in claim 1, wherein the first storage electrode overlaps the common line to form a first storage capacitor.

9. The method as claimed in claim 1, wherein the second storage electrode overlaps the horizontal portion of the common electrode to form a second storage capacitor.

* * * * *